US012564538B1

(12) United States Patent
Lai

(10) Patent No.: US 12,564,538 B1
(45) Date of Patent: Mar. 3, 2026

(54) CHAIN-TYPE MASSAGE STRUCTURE AND MASSAGER

(71) Applicant: LONGNAN PINXIN MOTOR CO., LTD., Longnan (CN)

(72) Inventor: Guanxi Lai, Ganzhou (CN)

(73) Assignee: LONGNAN PINXIN MOTOR CO., LTD., Longnan (CN)

( * ) Notice: Subject to any disclaimer, the term of this patent is extended or adjusted under 35 U.S.C. 154(b) by 0 days.

(21) Appl. No.: 19/320,237

(22) Filed: Sep. 5, 2025

Related U.S. Application Data

(63) Continuation-in-part of application No. PCT/CN2025/111789, filed on Jul. 31, 2025.

(51) Int. Cl.

*A61H 19/00* (2006.01)
*A61H 7/00* (2006.01)
*A61H 15/00* (2006.01)
*A61H 23/02* (2006.01)

(52) U.S. Cl.

CPC ............ *A61H 19/44* (2013.01); *A61H 7/007* (2013.01); *A61H 15/0085* (2013.01); *A61H 23/0254* (2013.01); *A61H 2015/0014* (2013.01); *A61H 2015/0042* (2013.01); *A61H 2201/0192* (2013.01); *A61H 2201/1669* (2013.01); *A61H 2201/1676* (2013.01); *A61H 2205/087* (2013.01)

(58) Field of Classification Search

None

See application file for complete search history.

(56) References Cited

U.S. PATENT DOCUMENTS

| | | | | |
|---|---|---|---|---|
| 12,245,982 | B1 * | 3/2025 | Zhao | A61H 23/0263 |
| 2009/0069730 | A1 * | 3/2009 | Knyrim | A61H 23/0263 601/134 |
| 2009/0198158 | A1 * | 8/2009 | Nan | A61H 23/0254 601/87 |
| 2017/0020775 | A1 * | 1/2017 | Rydel | A61H 19/44 |
| 2024/0099929 | A1 | 3/2024 | Qian | |
| 2025/0134760 | A1 * | 5/2025 | Liu | A61H 19/40 |
| 2025/0213423 | A1 * | 7/2025 | Weekly | A61H 19/44 |

FOREIGN PATENT DOCUMENTS

| | | | |
|---|---|---|---|
| CN | 118078604 | A | 5/2024 |
| DE | 102022106346 | B4 | 10/2023 |

* cited by examiner

*Primary Examiner* — Thaddeus B Cox

(74) *Attorney, Agent, or Firm* — Ming Jiang; MM IP SERVICES LLC

(57) ABSTRACT

A chain-type massage structure and a massager are provided. The chain-type massage structure includes: a driving assembly, provided with a driving member and a driving rod; where the driving member is connected to the driving rod; a massage assembly, provided with a fixed chain link and a plurality of movable chain links; where each of the movable chain links includes a support body and hinge portions; where the hinge portions are disposed on two circumferential sides of the support body; the support body is provided with a gap for the driving rod to penetrate; and a plurality of the movable chain links are sequentially hinged through the hinge portions. The chain-type structure better adapts to the contours and curves of the human body, which provides massage effects of squeezing and peristalsis, enhances the comfort and experience, and overcomes the drawbacks of conventional massage structures including stiffness and unnaturalness of motion.

20 Claims, 13 Drawing Sheets

CHAIN-TYPE MASSAGE STRUCTURE AND MASSAGER

CROSS REFERENCE TO RELATED APPLICATIONS

The present disclosure claims priorities of Chinese Patent Application No. 2025/111789, filed-on-Jul. 31, 2025, the entire contents of which are hereby incorporated by reference.

TECHNICAL FIELD

The present disclosure belongs to the technical field of sexual products, relates to the technology of providing a chain-type massage structure, and particularly relates to a chain-type massage structure and a massager.

BACKGROUND

Sexual massagers are massage devices specially designed for adults, with an aim to provide users with more private and comfortable experiences by simulating the tactile sensations and movements of manual massage. Such massagers have been widely used for improving physical and mental pleasure of individual users relieving stress, and promoting self-exploration. With an increase in market demand, a variety of sexual massagers have been developed continuously, including vibrating wands, suction devices, massage wands, multi-functional vibration devices, and the like.

Insertable massagers in the prior art mostly have fixed structures, and usually lack sufficient joints or flexible connections, resulting in that they hardly adapt to internal natural curves of the human body during use, and particularly have poor adaptability to minor curvatures and angular displacements in the massage area. Due to the lack of flexibility of the massager, especially for sensitive areas, the non-fitting design maybe leads to excessive friction or pressure concentration, and causes fatigue or even slight discomfort, where the massager seems to be more stiff and mechanical especially in dynamic use scenarios.

SUMMARY

In order to solve the above technical problems, the present disclosure provides a chain-type massage structure and a massager.

In order to achieve the above objectives, the present disclosure adopts the following technical solutions:

a chain-type massage structure is provided, including:

a driving assembly, provided with a driving member and a driving rod;

where the driving member is connected to the driving rod, and the driving rod has a helical structure;

a massage assembly, provided with a fixed chain link and a plurality of movable chain links;

where each of the movable chain links includes a support body and hinge portions;

where the hinge portions are disposed on two circumferential sides of the support body;

the support body is provided with a gap for the driving rod to penetrate;

a plurality of the movable chain links are sequentially hinged through the hinge portions to form a bendable chain-type structure;

one end portion N1 of the fixed chain link is fixedly connected to the driving member, and the other end portion N2 thereof is hinged to one of the movable chain links; and in a direction away from the fixed chain link, a width W1 of the gap of the first movable chain link is greater than or equal to a width WN of the gap of any of the remaining movable chain links.

Preferably, in the direction away from the fixed chain link, a width W2 of the gap of the second movable chain link is equal to the width W1 of the gap of the first movable chain link and is greater than the width WN of the gap of any of the remaining movable chain links.

Preferably, in the direction away from the fixed chain link, the following condition is satisfied:

$$D1>WN\geq D2;$$

where D1 represents a maximum motion trajectory diameter of the bent portion of the driving rod when rotating, and D2 denotes a body diameter of the driving rod.

Preferably, a hinge point between the fixed chain link and the first movable chain link is a chain node A, the other hinge point of the first movable chain link is a chain node C, and a distance between the chain node A and the chain node C is expressed by H, which satisfies the following relationship:

$$H/2+W1=D1.$$

Preferably, in the direction away from the fixed chain link, when the support body of the first movable chain link is parallel to the fixed chain link, a distance L1 between the support body and the fixed chain link is greater than a spacing LN between any two adjacent movable chain links when their support bodies are parallel to each other.

Preferably, each of the hinge portions includes two chain nodes, and the chain nodes are respectively configured to hinge the movable chain link with two adjacent movable chain links so as to form a chain-type structure.

Preferably, the chain link among the movable chain links farthest from the fixed chain link is a head chain link;

an end portion of the driving rod penetrates the head chain link; and the end portion of the driving rod rotates freely.

Preferably, the head chain link is provided with a central hole;

the end portion of the driving rod penetrates the central hole; and the end portion of the driving rod rotates freely in the central hole.

Preferably, a filling member is disposed in the central hole; the filling member has elasticity; and the filling member fills a gap between the end portion of the driving rod and an inner wall of the central hole.

Preferably, a massage head portion is included;

where the massage head portion is connected to the head chain link; and the massage head portion moves in response to the angular displacement of the head chain link to form a swinging motion.

Preferably, a stimulation device is included;

the stimulation device is disposed in the massage head portion;

the stimulation device delivers a vibration massage stimulation; or the stimulation device delivers a telescopic massage stimulation.

Preferably, the massage head portion has a straight rod-shaped structure;

alternatively, the massage head portion has a curved rod-shaped structure;

alternatively, the massage head portion has a spherical structure; and alternatively, the massage head portion has a mushroom head-shaped structure.

Preferably, the fixed chain link and the movable chain links are provided with threading holes.

Preferably, the threading holes are located outside an area where the driving rod applies a force to the fixed chain link and the movable chain link.

Preferably, an end face of the movable chain link facing the fixed chain link is provided with a limiting flange; and the limiting flange protrudes toward the fixed chain link in a circumferential direction of the movable chain link.

Preferably, a linear driving structure is included;

where the linear driving structure is respectively connected to the driving member and the massage assembly; and the linear driving structure is configured to drive the massage assembly to perform a linear reciprocating motion.

A massager is further provided in the present disclosure, including:

a silicone layer;

a chain-type massage structure;

where the chain-type massage structure includes a driving assembly and a massage assembly;

a driving assembly, provided with a driving member and a driving rod;

where the driving member is connected to the driving rod, and the driving rod has a helical structure;

the massage assembly is provided with a fixed chain link and a plurality of movable chain links;

where each of the movable chain links includes a support body and hinge portions disposed on two circumferential sides of the support body;

the support body is provided with a gap for the driving rod to penetrate;

a plurality of the movable chain links are sequentially hinged through the hinge portions to form a bendable chain-type structure;

both ends of the fixed chain link are respectively connected to the driving member and the movable chain link;

the silicone layer is wrapped around an exterior of the chain-type massage structure; and the driving rod pushes the silicone layer to arch outward through the movable chain link to massage the user's massage area.

Preferably, a plurality of the massage heads are disposed on an outer surface of the silicone layer.

Preferably, the silicone layer includes a plurality of first areas and a plurality of second areas;

the plurality of the first areas and the plurality of the second areas are disposed in a staggered manner;

a thickness of each of the first areas is larger than a thickness of each of the second areas;

the massage heads are disposed in the first areas;

and each of the first areas is provided with at least one of the massage heads.

Preferably, a plurality of positioning grooves are formed on an inner wall of the silicone layer;

a plurality of the movable chain links are in one-to-one correspondence with a plurality of the positioning grooves;

one side of the support body that pushes the silicone layer to arch outward extends into the positioning groove, and the other side of the support body disengages from the positioning groove; and a plurality of the massage heads are in one-to-one correspondence with a plurality of the positioning grooves.

The present disclosure provides a chain-type massage structure and a massager, which have the following beneficial effects:

In practical applications, the serpentine transmission ensures that the chain-type structure better adapts to the contours and curves of the human body during insertion into the human body, which provides massage effects similar to squeezing and peristalsis, and enhances the comfort and experience. Through the design that the helical shape of the driving rod drives some of the movable chain links to move and then the movable chain links in motion progressively drive other movable chain links to move, the chain-type massage structure achieves a flexible and conformal serpentine transmission trajectory, and overcomes the drawbacks of conventional massage structures including stiffness and unnaturalness of motion.

REFERENCE NUMERALS IN THE FIGURES

Figure 1:
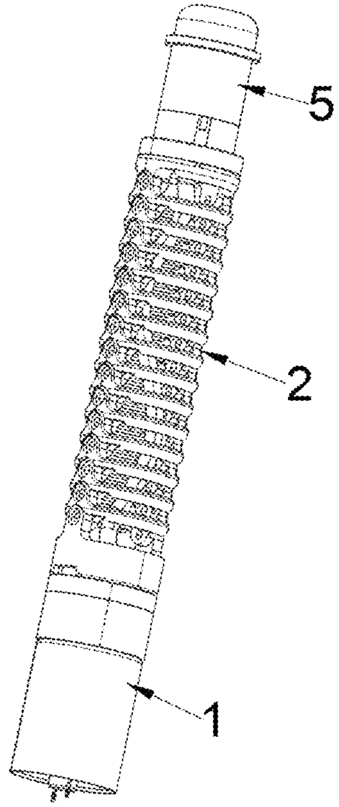
FIG. 1 is a perspective view I of a chain-type massage structure provided by the present disclosure.
Figure 2:
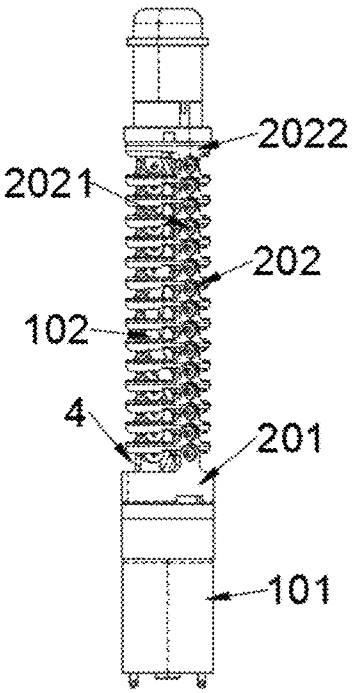
FIG. 2 is a front view of a chain-type massage structure provided by the present disclosure.
Figure 3:
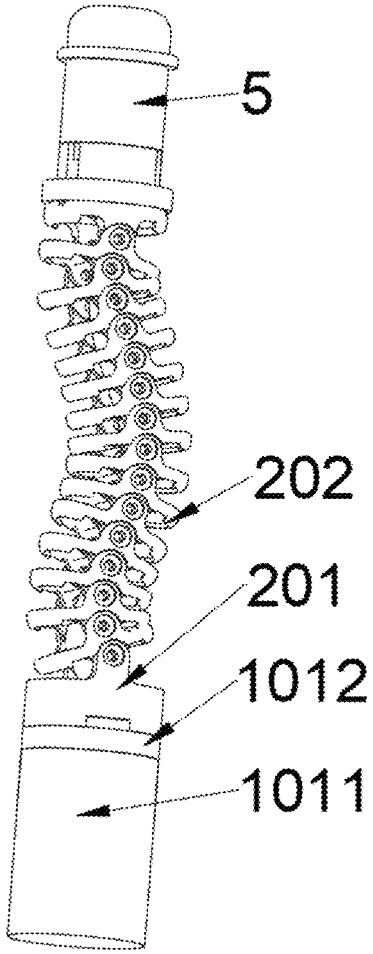
FIG. 3 is a perspective view II of a chain-type massage structure provided by the present disclosure.
Figure 4:
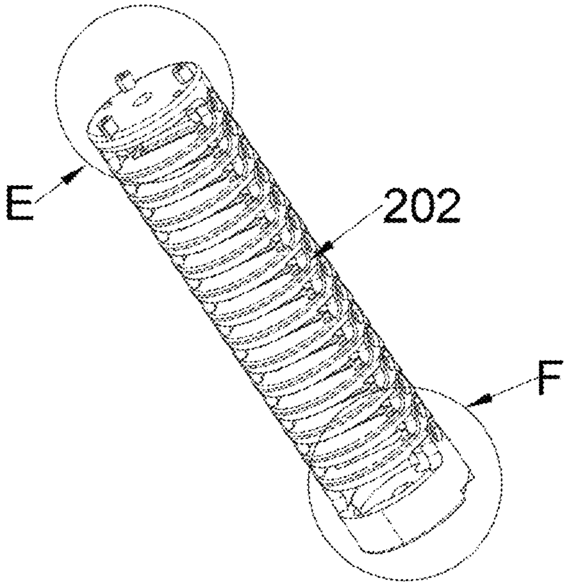
FIG. 4 is a perspective view of a movable chain link in a chain-type massage structure provided by the present disclosure.
Figure 5:
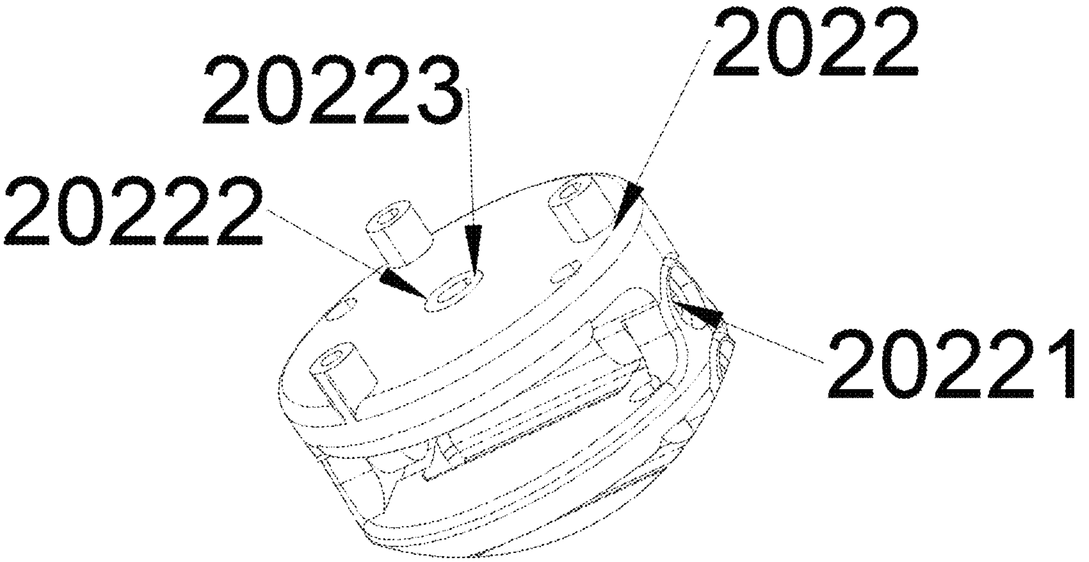
FIG. 5 is a partial enlarged view of a portion E in FIG. 4.
Figure 6:
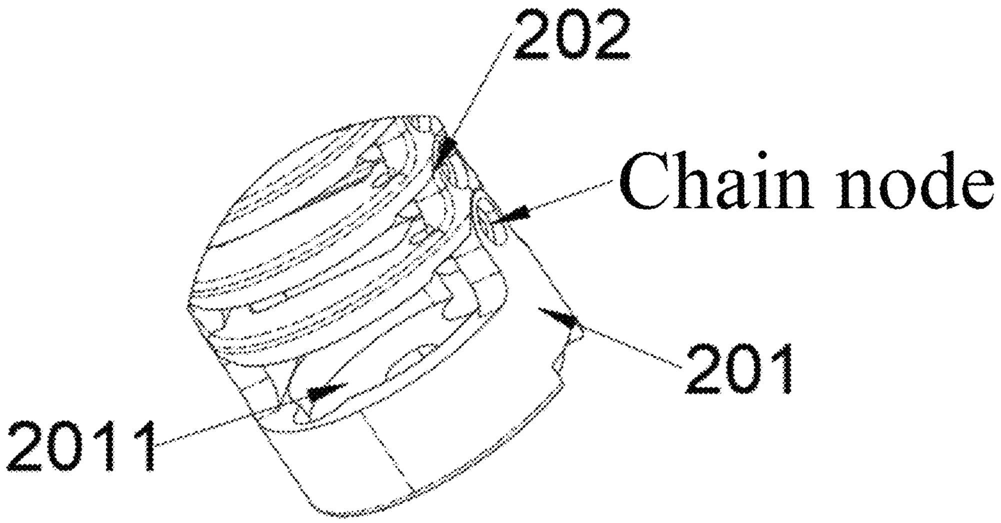
FIG. 6 is a partial enlarged view of a portion F in FIG. 4.
Figure 7:
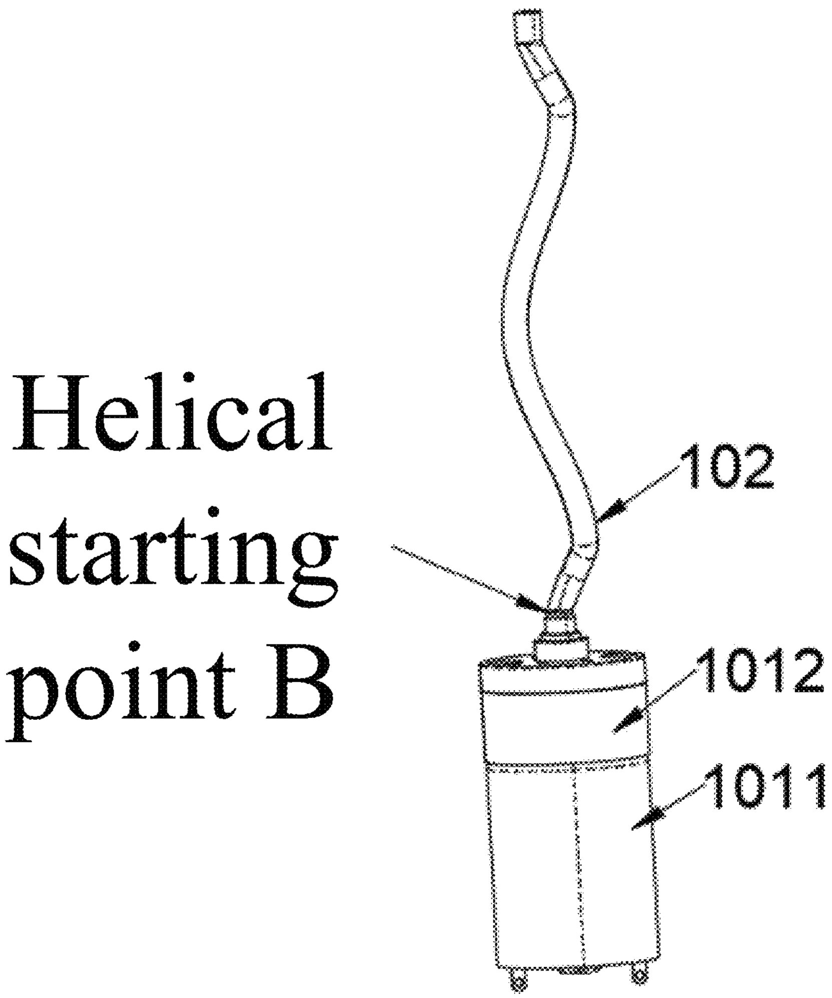
FIG. 7 is a schematic structural diagram of a driving assembly in a chain-type massage structure provided by the present disclosure.

1—driving assembly; 101—driving member; 1011—driving motor; 1012—gearbox; 102—driving rod; 2—massage assembly; 201—fixed chain link; 2011—sink groove; 202—movable chain link; 2021—hinge portion; 2022—head chain link; 20221—chain link structure; 20222—central hole; 20223—filling member; 2023—limiting flange; 2024—support body; 3—gap; 4—axial gap; 5—massage head portion; 6—stimulation device; 601—vibration device; 602—telescopic device; 7—silicone layer; 70—massage head; 71—first area; 72—second area; 73—positioning groove; 8—linear driving structure; 801—rotating seat; 802—helical groove; 803—displacement seat; and 804—sliding block.

DETAILED DESCRIPTIONS OF THE EMBODIMENTS

The technical solutions in the examples of the present disclosure will be clearly and completely described below in combination with the accompanying drawings in the embodiments of the present disclosure. Apparently, the embodiments described are merely some rather than all of the embodiments of the present disclosure. Based on the embodiments of the present disclosure, all other embodiments obtained by those of ordinary skill in the art without making creative efforts shall fall within the protection scope of the present disclosure.

With reference to FIGS. 1 to 18, specific embodiments provided by the present disclosure are as follows:

As shown in FIGS. 1 to 10, a chain-type massage structure is provided in a first embodiment of the present disclosure, including:

- a driving assembly 1, provided with a driving member 101 and a driving rod 102;
- where the driving member 101 is connected to the driving rod 102, and the driving rod 102 has a helical structure;
- a massage assembly 2, provided with a fixed chain link 201 and a plurality of movable chain links 202;
- where each of the movable chain links 202 includes a support body 2024 and hinge portions 2021;
- where the hinge portions 2021 are disposed on two circumferential sides of the support body 2024;
- the support body 2024 is provided with a gap 3 for the driving rod 102 to penetrate;
- a plurality of the movable chain links 202 are sequentially hinged through the hinge portions 2021 to form a bendable chain-type structure;
- where the driving rod 102 is disposed in the gaps 3 of the plurality of the movable chain links 202 in a penetrating manner, and rotation sequentially drives each of the movable chain links 202 to undergo angular displacement relative to an axis of the driving rod 102, which causes continuous transfer of the angular displacement between the movable chain links 202; and
- in this embodiment, the core concept lies in that all the movable chain links 202 induce serpentine transmission through chain-type connections. The driving rod 102 in the driving assembly 1 has a helical structure, the helical structure means that the driving rod 102 is shaped like a helical line extending in an axial direction, is S-shaped, or has any other similar shape with continuously curved lines; and the rotation of the driving rod 102 not only acts on one of the movable chain links 202, but also drives all the movable chain links 202 to undergo the angular displacement sequentially. A coherent transmission chain is formed due to cooperation between the movable chain links 202, such that the angular displacement of each of the movable chain links 202 is progressively transferred to the next movable chain link 202, and ultimately the serpentine transmission is formed in a continuous and gentle manner.

The helical structure mentioned in the present disclosure means that the driving rod 102 includes a plurality of bending portions deviating from a rotation axis. However, the specific number of the bending portions, a spacing of distribution in the axial direction of the driving rod 102, and their spatial positional relationships (e.g., angular offsets) are not specifically limited, but may be arbitrarily set.

A cross section of the driving rod 102 in a direction parallel to its own extension direction mentioned in the present disclosure may be circular, semicircular, rectangular, polygonal, triangular, or even irregular in shape. In the present disclosure, a circular cross section of the driving rod 102 in a direction parallel to its own extension direction is described for illustrative purposes.

A force provided by the driving rod 102 is flexibly dispersed in the entire movable chain, and is not concentrated at a single point or area. Since each of the movable chain links 202 possesses a certain freedom degree and motion range in angular displacement, and the entire chain exhibits a natural wave-like bending effect, which enables to better fit human body curves even in in-vivo applications. The serpentine transmission ensures that the massage assembly 2 maintains a smooth movement trajectory even during insertion into the human body, without discomfort caused by insufficient rigidity or excessive stiffness.

Moreover, the serpentine transmission depends on an angular transmission mechanism for the movable chain links 202. Through the helical structure design, the driving rod 102 drives some of the movable chain links 202 to undergo angular displacements, which gradually affects adjacent movable chain links 202, and ultimately forms a serpentine transmission trajectory in the entire structure. Specifically, due to a unique helical path design, the driving rod 102, when rotating, first drives some of the movable chain links 202 to undergo angular displacements, and the angular displacements of these initial movable chain links 202 are progressively transmitted to the surrounding movable chain links 202, thereby forming a natural "wave-like bending" effect.

The formation of the serpentine transmission depends on the progressive transmission between the movable chain links 202: when the driving rod 102 drives one of the movable chain links 202 to move, the angular displacement of this movable chain link 202 affects the adjacent movable chain link 202, and the adjacent movable chain link 202 further transmits the displacement to the next movable chain link 202. In this way, the helical rotation of the driving rod 102 progressively extends in the chain-type structure, and ultimately causes a gentle serpentine transmission of the entire chain. The angular displacement of each of the movable chain links 202 is transmitted and adjusted layer by layer, which avoids the abrupt motion, and ensures the smoothness and stability of motion.

The progressively transmitted serpentine transmission brings significant benefits. First, since the angular displacement of the movable chain links 202 is progressively transmitted, the motion process is more natural and coherent, such that the chain-type massage structure adapts to natural curves of human body and provides a sense of gentle and comfortable fitting. Secondly, the progressive transmission effectively disperses an initial force applied to the driving rod 102, which avoids a single movable chain link 202 from bearing an excessive force, reduces structural wear, and prolongs the service life of assemblies.

In practical applications, the serpentine transmission ensures that the chain-type structure better adapts to the contours and curves of the human body during insertion into the human body, which provides massage effects similar to squeezing and peristalsis, and enhances the comfort and experience. Through the design that the helical shape of the driving rod 102 drives some of the movable chain links 202 to move and then the movable chain links 202 in motion progressively drive other movable chain links 202 to move, the chain-type massage structure achieves a flexible and conformal serpentine transmission trajectory, and overcomes the drawbacks of conventional massage structures including stiffness and unnaturalness of motion.

Additionally, the chain-type serpentine transmission exhibits a high degree of adaptability. Since automatic angular adjustment at each of the movable chain links 202 is achieved through the serpentine transmission, the entire structure adapts to different spaces and curves according to different needs or position changes of the human body. The wave-like bending motion of the movable chain links 202 achieves a certain massage effect, and a gentle squeezing effect. This feature ensures that the chain-type massage structure provides more flexible and comfortable experience in different in-vivo scenarios.

To sum up, in the embodiment, coordinated transmission between the movable chain links 202 results in formation of a natural serpentine transmission, and achieves the effects of flexible fitting, uniform transmission, and smooth motion. The cooperation between the movable chain links 202 not only enhances the comfort and stability of the motion, but also ensures a more natural massage experience during insertion into the human body.

Based the above, the fixed chain link 201 is further added, and one end portion N1 of the fixed chain link 201 is fixedly connected to the driving member 101, and the other end portion N2 thereof is chain-connected to one of the movable chain links 202. The reason is that the fixed chain link 201 forms a stable support between the driving member 101 and the movable chain link 202, such that a driving force from the driving member 101 is stably transmitted to the movable chain link 202. Such arrangement prevents swinging or shifting that occurs when the driving member 101 directly drives the movable chain link 202, and enhances the stability of the transmission. Moreover, a stable connection point provided by the fixed chain link 201 ensures that an initial position of the chain (referring to the entirety composed of a plurality of the movable chain links 202) is less likely to shift, such that the serpentine transmission starts from a stable base point, thereby creating a smoother and more coherent transmission effect.

Based on the above, it is further added that in a direction away from the fixed chain link 201, a width W1 of the gap 3 of the first movable chain link 202 is greater than or equal to a width WN of the gap 3 of any of the remaining movable chain links 202. Such differentiation aims to optimize the motion effect of the driving rod 102. Since a bent portion of the driving rod 102 has a large motion trajectory diameter when rotating, to ensure that the remaining movable chain links 202 are smoothly driven by the driving rod 102 to form a serpentine transmission, the width WN of the gap 3 must be smaller than a maximum motion trajectory diameter of the bent portion of the driving rod 102 when rotating. However, when the width of the gap 3 of the first movable chain link 202 is the same as WN, excessive rotational resistance is imposed on to the driving rod 102.

Since the first movable chain link 202 is close to a helical starting point B of the driving rod 102, when the driving rod 102 starts to rotate, an initial driving force is required to overcome significant frictional resistance and contact resistance. When the width of the gap 3 of the first movable chain link 202 is the same as that of any of the remaining movable chain links 202 (i.e., W1=WN), the resistance is further amplified, which may cause difficulty or even jamming in rotating the driving rod 102, thereby seriously affecting the normal operation of the chain-type massage structure provided by the present disclosure.

To reduce the resistance of the first movable chain link 202 against the rotation of the driving rod 102, a common solution is to install the first movable chain link 202 at a position away from the helical starting point B of the driving rod 102, so as to maintain a sufficient distance between them. However, such adjustment introduces new problems:

An axial gap 4 between the driving rod 102 and the first movable chain link 202 increases. An excessively large axial gap 4 may cause the driving rod 102 to pinch an outer silicone layer during operation, increase the risk of wear, and shorten the service life of the chain-type massage structure provided by the present disclosure.

To solve the above problems, the width W1 of the gap 3 of the first movable chain link 202 may be appropriately increased to effectively reduce the resistance to the driving rod 102 and prevent jamming thereof. This not only ensure the smooth rotation of the driving rod 102 at the helical starting point B, but also prevents generation of the excessive axial gap 4 caused by increasing an installation distance.

Increasing the width W1 of the gap 3 of the first movable chain link 202 not only solves the problem of an excessive initial motion resistance of the driving rod 102, but also minimizes the latent risks of the excessive axial gap 4 and damage to the outer silicone layer that are common in traditional methods, thereby achieving the dual improvement of the chain-type massage structure provided by the present disclosure in reliability and durability.

In practical applications, an inner wall of the gap 3 of the first movable chain link 202 is not in contact with the driving rod 102, and the movable chain link 202 is pulled by the other movable chain links 202 to rotate.

Furthermore, in the direction away from the fixed chain link 201, a width W2 of the gap 3 of the second movable chain link 202 is equal to the width W1 of the gap 3 of the first movable chain link 202 and is greater than or equal to the width WN of the gap 3 of any of the remaining movable chain links 202, which further enhances the stability and reliability of the motion of the driving rod 102 and optimizes the mechanical transmission effect of the entire system.

Although increasing the width W1 of the gap 3 of the first movable chain link 202 may effectively reduce the resistance when the driving rod 102 rotates, when the width of the gap 3 of the second movable chain link 202 remains identical to that of any of the remaining movable chain links 202 (i.e., W2=WN), a new resistance peak is generated when the bent portion of the driving rod 102 rotates to the second movable chain link 202. An excessively small gap 3 of the second movable chain link 202 increases a frictional resistance of the driving rod 102. A sudden change in resistance may cause discontinuity or even jamming in the motion of the driving rod 102, which affects the overall coherence of the serpentine transmission.

When the width W2 of the gap 3 of the second movable chain link 202 is the same as the width W1 of the gap 3 of the first movable chain link 202 and greater than the width WN of the gap 3 of any of the remaining movable chain links 202, such design significantly alleviates the following problems:

The first and second movable chain links 202 collectively form a uniform width buffer zone, which effectively reduces the resistance accumulation of the driving rod 102 near the helical starting point. The gradient transition of the gap 3 minimizes abrupt resistance changes, and enhances the coherence of the serpentine transmission. A larger width of the gap 3 provides sufficient freedom for the driving rod 102, and ensures that its bent portion rotates freely.

When the width W2 of the gap 3 of the second movable chain link 202 is equal to the width W1 of the gap 3 of the first movable chain link 202 and greater than the width WN of the gap 3 of any of the remaining movable chain links 202, such design further enhances the mechanical adaptability between the driving rod 102 and the movable chain links 202. This not only ensures the smooth rotation of the driving rod 102, but also significantly enhances the coherence of the serpentine transmission and the overall reliability of the chain-type massage structure provided by the present disclosure, which reflects meticulous consideration of the gradient mechanical characteristics of the motion system.

It should be noted that the support body 2024 is a sheet-like or plate-like structural component with certain strength and rigidity. A gap 3 of a certain size is formed in a center of the support body 2024, and the driving rod 102 penetrates the gap 3, which drives a plurality of the movable chain links 202 to form a serpentine transmission.

It should be noted that the chain-type structure refers to a continuous structure formed by sequentially hinging a plurality of the movable chain links 202, where all the movable chain links 202 are flexibly connected through the hinge portions 2021, such that the overall structure has certain flexibility and adaptability, and achieves coordinated motion under the driving action of the driving rod 102.

It should be noted that the driving rod 101 is divided into two segments, where the first segment is a straight segment configured to connect the driving member 101, and the second segment is a helical segment disposed in the gaps 3 of a plurality of the support bodies 2024 in a penetrating manner. A distal end of the straight segment is connected to a start end of the helical segment, and a connection position is the helical starting point B. The helical starting point B marks a transition point of the driving rod 101 from the straight segment to the helical segment, and is an initial position where the driving rod 101 enters the helical path and starts to drive the chain-type structure to move.

In a specific embodiment, the driving rod 102 is made of a rigid material, which ensures that the driving rod 102 has sufficient stability and reliability when the driving force is transmitted.

Specifically, the rigid material has excellent bending resistance, and maintains a stable shape and strength during the driving process, thereby effectively transmitting the driving force, and ensuring the precise and consistent motion of the chain. The rigid driving rod 102 stably drives the movable chain links 202 to undergo angular displacements, which prevents the driving force attenuation and deformation that may be caused by use of the flexible material.

Moreover, the rigid driving rod 102 does not bend or twist during transmission, which ensures that the stable and precise motion trajectory of each of the movable chain links 202, reduces motion errors caused by offset, and ensures the smoother and precise serpentine transmission of the chain-type structure.

In another specific embodiment, the driving rod 102 is made of a material with certain flexibility, which further enhances the adaptability and comfort of the chain-type massage structure. The flexible driving rod 102 possesses a certain elastic deformation capability when transmitting the driving force, such that the massager better adapts to the curve of the human body, and brings a gentler massage experience.

Specifically, the flexible driving rod 102 moderately bends with the swinging of the movable chain links 202 during transmission, which enables to more naturally fit undulating curves of the human body, and brings a more comfortable experience especially in in-vivo or complex massage applications.

Moreover, the elasticity of the flexible material ensures that the driving rod 102 does not generate excessive thrust when driving the movable chain links 202 to move, which creates a sense of gentler massage touch, and is suitable for sensitive areas that require shallow massage and gentle massage.

Furthermore, the driving rod 102 employs a structure combining rigidity and flexibility, that is, on the overall rigid driving rod 102, an elastic structure is disposed at a peak position of the helical path. This ensures that the driving rod 102 exhibits stable rigidity when transmitting the driving force, which achieves flexible buffering performance and adaptability at key positions. Specifically, the overall structure of the driving rod 102 is still made of a rigid material, which ensures sufficient strength and stability during transmission, such that precise and reliable force transmission of the chain is maintained during motion. The elastic structure is disposed at a peak position of the helical path, such that the driving rod 102 may be moderately bent or elastically adjusted at these key positions. The flexible structure creates a buffering effect at the peak position, thereby enhancing the naturalness and coherence of the serpentine transmission and adapting to the undulation of human body curves.

Moreover, when the rigid-flexible driving rod 102 transmits the serpentine transmission, whenever a driving force is transmitted to the peak position, the elastic structure absorbs part of the driving force, such that a force applied by the driving rod 102 on the movable chain link 202 is gentler, which slows down the angular displacement of each of the movable chain links 202, and forms a more natural wave-like bending effect.

In a specific embodiment, the driving member 101 includes a driving motor 1011 and a gearbox 1012. The driving motor 1011 provides a rotational driving force, and the gearbox 1012 adjusts and transmits the driving force, such that the entire chain-type massage structure achieves precise and stable serpentine transmission. Through the combination of the driving motor 1011 and the gearbox 1012, the driving member 101 is significantly improved in terms of power output, control accuracy, and transmission efficiency.

In a specific embodiment, the end portion N1 of the fixed chain link 201 refers to an end face (a plane) facing the driving member 101, and the end portion N2 thereof refers to an end face away from the driving member 101.

Based on the above, in order to ensure that the width W of the through gap 3 is sufficient to reduce the motion interference between the driving rod 102 and the movable chain link 202 and ensure the overall smoother operation of the structure, the width W of the gap 3 is correlated with key parameters of the driving rod 102 (including a pitch P, a body diameter D1, and a lead angle θ), to ensure the smooth motion of the driving rod 102 in the chain (specifically referring to the entirety composed of a plurality of the movable chain links 202), and provide sufficient space for the serpentine transmission of the driving rod 102.

Based on this, a compensation width for radial motion is increased, and during the serpentine transmission of the driving rod 102, the driving rod 102 undergoes a certain radial displacement (an undulation of the serpentine transmission) due to the lead angle θ of the helical path, so the maximum motion trajectory diameter D1 may be expressed by the following formula: $D1=D2+2\star(P\star\tan(\theta))$;

where D2 is a body diameter of the driving rod 102, and $(P\star\tan(0))$ represents a maximum radial displacement of the driving rod 102.

Through combination of a basic width and a radial compensation width, an optimal solution formula for the through gap 3 may be derived:

$W=D2+k\star D1$, where k is an adjustment coefficient used to adjust the width according to the needs of different movable chain links 202. Usually, k may take a larger value for an initial movable chain link 202 of the chain to enlarge the gap 3, and k may take a smaller value for a movable chain link 202 at the distal end of the chain to narrow of the gap 3.

D1 is substituted with the result of the above formula, and the formula $W=D2+k\star(D2+2\star P\star\tan(\theta))$ is obtained;

A radial motion compensation $k\star(D2+2\star P\star\tan(\theta))$ leaves sufficient space for the serpentine transmission of the driving rod 102. The width of the gap 3 is controlled to ensure that the rotation and wave-like bending motion of the driving rod 102 in each chain link are smoothly achieved without interfering with the smooth motion of the chain due to lack of space.

For the adjustment coefficient k and the initial movable chain link 202 of the chain, a larger width of the gap 3 is usually required to address the initial angular displacement, such that a larger value of k (=1.2 to 1.5) may be taken; and for the distal end of the chain, an appropriately reduced value of k (=1.0) may be taken, such that more precise control of the movable chain link 202 at the distal end is achieved.

Such arrangement balances the basic passability of the driving rod 102 and the radial space requirement for the serpentine transmission, such that the chain meets the requirements for freedom of the driving rod 102 and employs a compact design of the gap 3 in width, which enhances the stability of transmission and facilitates the precise control of the overall structure.

Figure 9:
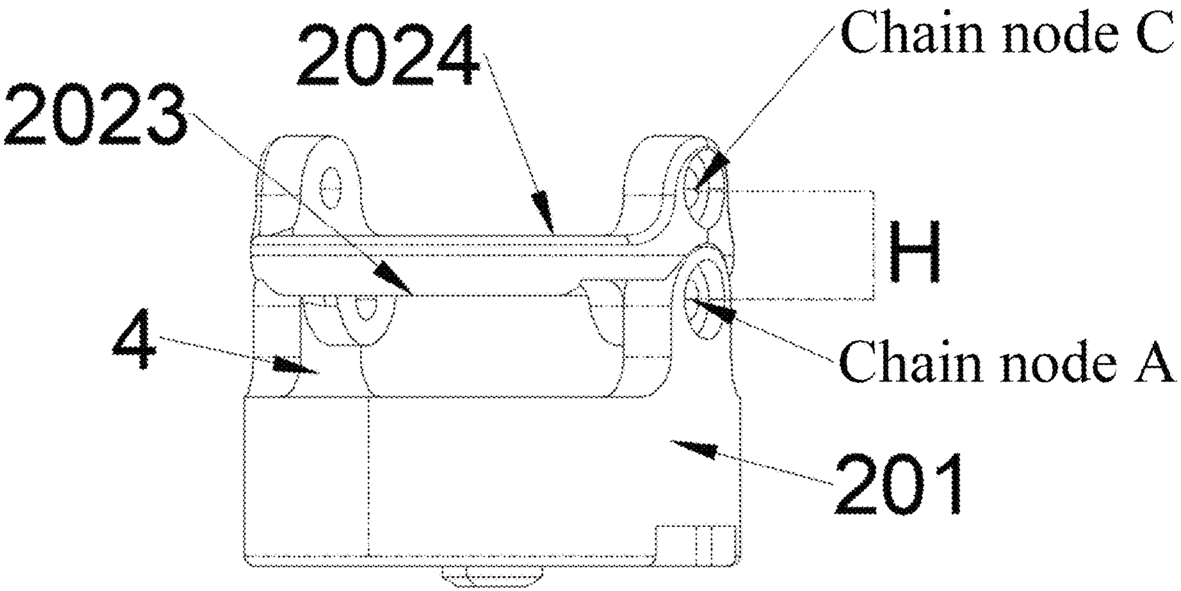
FIG. 9 is a front view of a structure shown in FIG. 8.

As shown in FIG. 9, a chain-type massage structure is provided in a second embodiment of the present disclosure, and on the basis of the previous embodiment, a distance between a chain node A and an adjacent chain node C is H, which satisfies the following relationship:

$$H/2+W1=D1.$$

In this embodiment, it is assumed that a sum of the distance between the chain node A and the adjacent chain node C and the width W1 of the initial gap 3 is equal to the maximum motion trajectory diameter of the driving rod 102, thereby ensuring that the driving rod 102 has access to sufficient space in the first movable chain link 202 to achieve stable transmission.

The design ensures that the driving rod 102 smoothly drives the first movable chain link 202 to undergo an angular displacement, thereby providing a stable starting point for the serpentine transmission of the chain.

Specifically, the distance between the chain node A and the adjacent chain node C is ½ of H, which provides a rotational buffer space for the driving rod 102 in the initial movable chain link 202. The buffer space allows the driving rod 102 to progressively apply a torque at an initial stage of motion, such that the angular displacement of the movable chain link 202 is gently transmitted, which prevents jamming or shaking caused by excessive abrupt torque transfer, and enhances the overall stability of transmission.

Moreover, in an initial transmission stage of the driving rod 102, the design satisfying the condition of $H/2+W1=D1$ provides sufficient motion space, which ensures that the driving rod 102 smoothly drives the first movable chain link 202 without excessive spatial restrictions. The design reduces the risk of jamming and interference, and ensures the smooth initiation of the chain motion.

Figure 12:
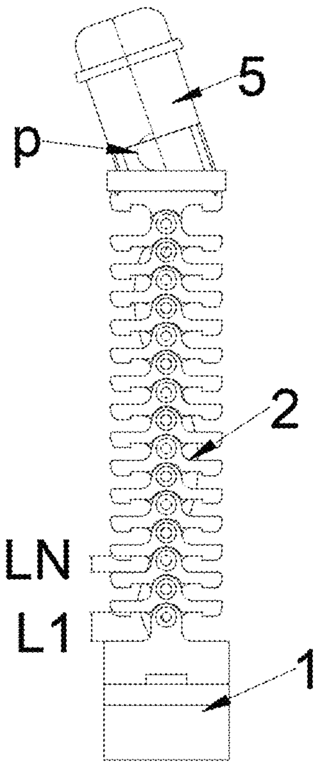
FIG. 12 is a schematic diagram of an included angle p (less than) 90° between a massage head portion and a head chain link in a chain-type massage structure provided by the present disclosure.

Based on the above, as shown in FIG. 12, in the direction away from the fixed chain link 201, when the support body 2024 of the first movable chain link 202 is parallel to the fixed chain link 201, a distance L1 between the support body 2024 and the fixed chain link 201 is greater than a spacing LN between any two adjacent movable chain links 202 when their support bodies 2024 are parallel to each other.

When the driving assembly drives the driving rod 102 to rotate and pushes the movable chain link 202 to swing around the hinge portion 2021, a relatively large L1 between the fixed chain link 201 and the first movable chain link 202 enables to provide a larger swing space, which prevents the bending restriction of an area (close to the driving assembly) due to a too small spacing, such that a portion of the chain-type structure close to a driving end of the driving assembly still flexibly adapts to the human body curves; and a smaller LN between the adjacent movable chain links 202 ensures the stability of connection between a middle and a front end of the chain-type structure, reduces the shaking caused by an excessive spacing, and ensures that a head chain link 2022 precisely responds to the action of the driving rod 102.

The spacing design balances the flexibility of the driving end and the stability of the front end: a larger L1 ensures that a root portion of the chain-type structure doesn't become rigid, and a smaller LN ensures precise force transmission, which enhances the overall adaptability of the massager to complex curves of the human body.

In a third embodiment of the present disclosure, a chain-type massage structure is provided, and on the basis of the previous embodiment, each of the movable chain links 202 includes hinge portions 2021 disposed on both sides thereof; and each of the hinge portions 2021 includes two chain nodes, and the chain nodes are respectively configured to hinge the movable chain link 202 with two adjacent movable chain links 202 so as to form a chain-type structure.

In this embodiment, the hinge portions 2021 are disposed on both sides of the movable chain link 202, and each of the hinge portions 2021 includes two chain nodes configured to hinge the movable chain link 202 with two adjacent movable chain links 202 so as to form a more flexible chain-type structure. The design not only ensures the stability of the chain, but also significantly enhances the flexibility and conformability of the chain-type massage structure.

Specifically, each of the movable chain links 202 is connected to an adjacent movable chain link 202 through two hinge portions 2021, and the hinge portions 2021 allow angular adjustment of the movable chain links 202 in a plurality of dimensions. The hinge structure ensures that the chain (specifically referring to the entirety composed of a plurality of the movable chain links 202) moves flexibly in a plurality of planes perpendicular to a driving direction, thereby achieving complex serpentine transmission and ensuring natural and smooth transmission.

Moreover, since each of the hinge portions 2021 includes two chain nodes, and certain rotational freedom exists between the movable chain links 202, which progressively buffers the force transmitted by the driving rod 102. The double-chain node hinge design effectively disperses the stress concentration during transmission, maintains overall gentle stress distribution of the chain during motion, prevents excessive stretching or contraction of the chain, and enhances the stability of the structure.

Thus, the double-chain node hinge design endows the chain with higher flexibility, and ensures a more natural serpentine transmission. The design is especially suitable for complex motion paths, and better adapts to natural curves of the human body, which enhances the conformability during massage.

Since each of the movable chain links 202 is connected to an adjacent movable chain link 202 through double chain nodes, the motion transmitted by the driving rod 102 is more precise and consistent, thereby preventing looseness or delay during motion. The stable connection of the double chain nodes ensures a balance of the chain during transmission, and ensures more coherent and smooth motion transmission.

In a specific embodiment, the hinge portions 2021 are pin shaft seats, and the adjacent movable chain links 202 are hinged at the pin shaft seats.

Figure 8:
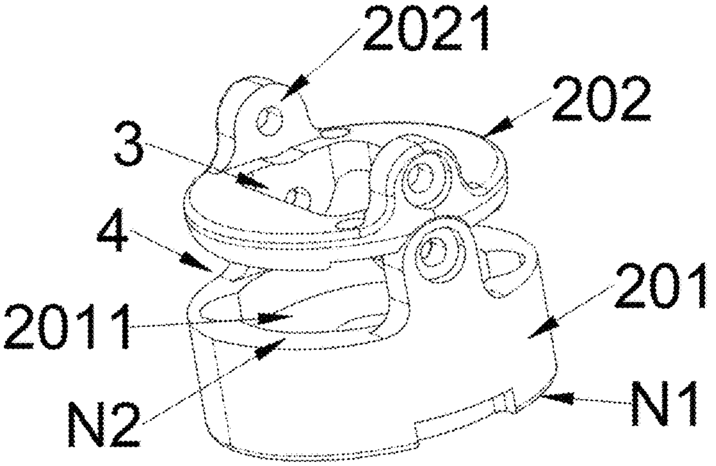
FIG. 8 is a schematic diagram of connection between a fixed chain link and a movable chain links in a chain-type massage structure provided by the present disclosure.
Figure 10:
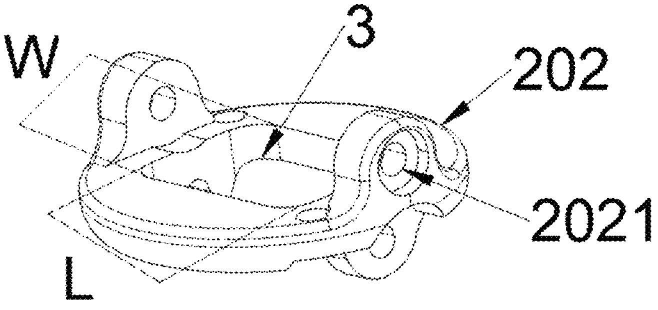
FIG. 10 is a schematic structural diagram of a movable chain link in a chain-type massage structure provided by the present disclosure.
Figure 11:
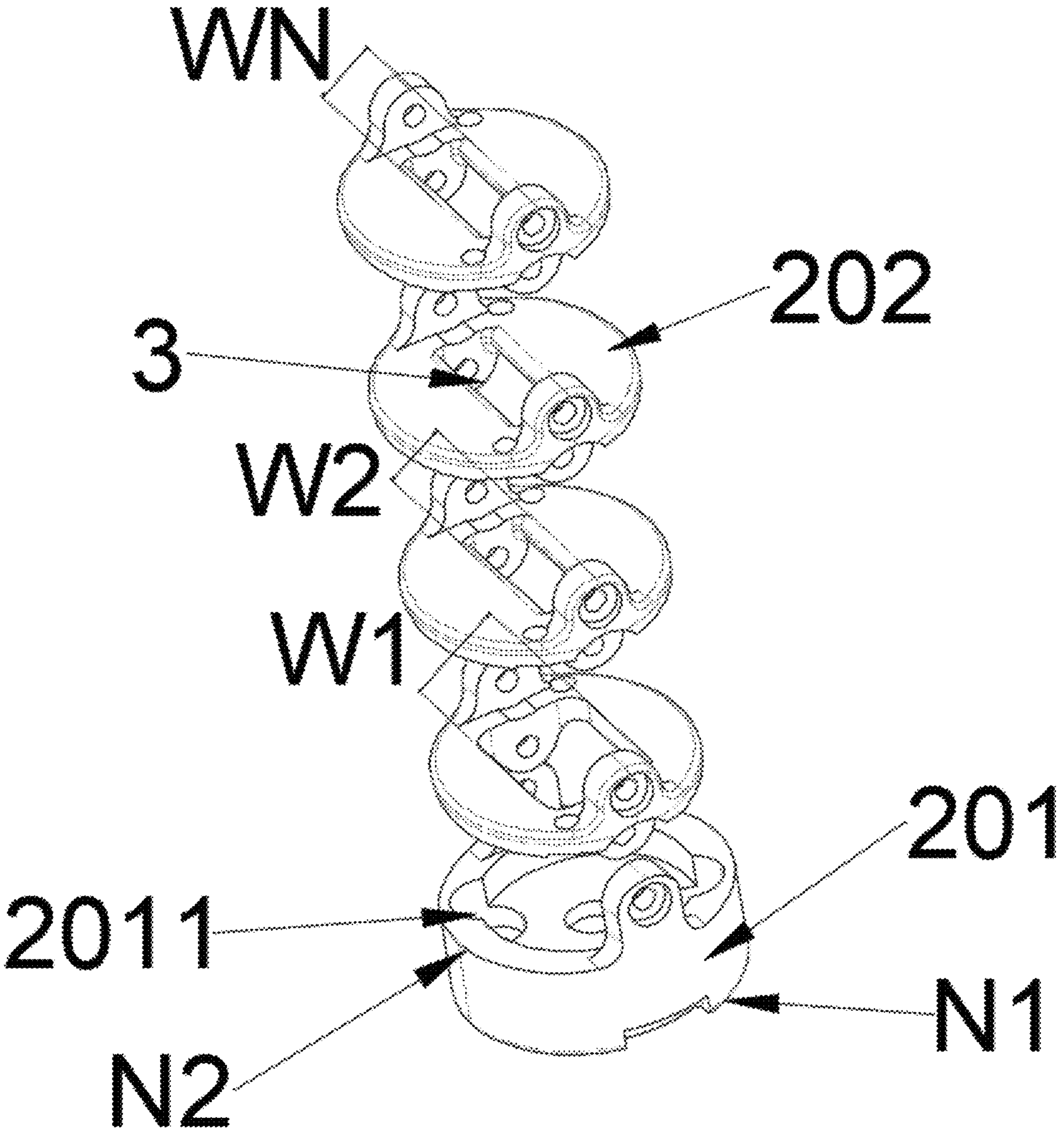
FIG. 11 is a schematic structural diagram of a fixed chain link and a plurality of movable chain links in a chain-type massage structure provided by the present disclosure.

As shown in FIGS. 8 to 10, a chain-type massage structure is provided in a fourth embodiment of the present disclosure, and on the basis of the previous embodiment, the end portion N2 of the fixed chain link 201 is provided with a sink groove 2011 recessed inward toward the driving member 101; and the helical starting point B of the driving rod 102 is at least located at a bottom surface of the sink groove 2011.

In this embodiment, the sink groove 2011 recessed inward toward the driving member 101 is formed at the end portion N2 of the fixed chain link 201, such that the helical starting point B of the driving rod 102 is at least located at the bottom surface of the sink groove 2011. The design helps to optimize a spatial layout and transmission effect between the driving rod 102 and the fixed chain link 201.

Specifically, the inwardly concave design of the sink groove 2011 provides additional space for the helical starting point of the driving rod 102, which achieves deeper embedding in the fixed chain link 201. This ensures that the driving rod 102 has access to sufficient space for helical motion in the initial rotation stage, thereby preventing interference with the fixed chain link 201.

Furthermore, the driving rod 102 starts applying a driving force at a position closer to the fixed chain link 201. This helps to improve the transmission efficiency of the driving force, ensures that the first movable chain link 202 responds to the rotation of the driving rod 102 in a timely and smooth manner, and enhances the initial effect of the serpentine transmission.

The sink groove 2011 provides a buffer space, which reduces the concentrated stress applied by the driving rod 102 on the fixed chain link 201 during initial driving. The sink groove 2011 is formed in the fixed chain link 201, such that the impact of the rotation of the driving rod 102 on the fixed chain link 201 is effectively dispersed, thereby reducing wear and potential structural damage, and prolonging the service life of the chain-type massage structure provided by the present disclosure.

The sink groove 2011 recessed inward toward the driving member 101 is formed at the end portion of the fixed chain link 201, the helical starting point of the driving rod 102 is at least located at the bottom surface of the sink groove 2011, and in this embodiment, the cooperation between the driving rod 102 and the fixed chain link 201 is effectively optimized. This design not only improves an initial driving effect of the driving rod 102, ensures the smooth transmission of the serpentine transmission, enhances the stability and durability of the chain-type massage structure, and further improves the overall performance of the chain-type massage structure provided by the present disclosure.

As shown in FIGS. 4 to 10, a chain-type massage structure is provided in a fifth embodiment of the present disclosure, and on the basis of the previous embodiment, the chain link among the movable chain links 202 farthest from the fixed chain link 201 is the head chain link 2022;

the end portion of the driving rod 102 penetrates the head chain link 2022; and the end portion of the driving rod 102 rotates freely.

In this embodiment, the chain link among the movable chain links 202 farthest from the fixed chain link 201 is designed as the head chain link 2022, the end portion of the driving rod 102 penetrates the head chain link 2022, and the end portion of the driving rod 102 is endowed with rotational freedom, which further enhances the functionality and flexibility of the chain-type massage structure.

Specifically, the end portion of the driving rod 102 is endowed with rotational freedom in the head chain link 2022, such that the end portion rotates freely in the head chain link 2022. The design of the head chain link 2022 meets different massage needs, and users may replace massage head portions 5 of different shapes or functions according to preferences.

For example, other functional modules such as a vibrator and a heating element may be added at the head chain link 2022 to enhance the versatility of the massager.

Moreover, the head chain link 2022 swings under the driving action of the driving rod 102, which achieves a massage effect similar to hand kneading. Thus, a massage head of different shapes such as such as a spherical, pointed, or roller-shaped massage head portion may be installed on the head chain link 2022, to achieve the combination of a plurality of massage techniques.

In this embodiment, the head chain link 2022 is disposed at an end portion of the chain-type massage structure, and the end portion of the driving rod 102 penetrates the head chain link 2022 and rotates freely, which enriches the functions of the massage structure, and achieves the combination of multi-dimensional massage techniques. This design not only enhances the massage effect, as well as the flexibility and adaptability of the chain-type massage structure provided by the present disclosure, but also optimizes the structure, prolongs the service life, and provides the user with a more comfortable and personalized massage experience.

In a specific embodiment, chain link structures 20221 are formed on both sides of an end face of the head chain link 2022 facing the driving member 101 and configured to hinge with an adjacent movable chain link 202.

In a sixth embodiment of the present disclosure, a chain-type massage structure is provided, and on the basis of the previous embodiment, the head chain link 2022 is provided with a central hole 20222;

- the end portion of the driving rod 102 penetrates the central hole 20222; and
- the end portion of the driving rod 102 rotates freely in the central hole 20222.

Specifically, the end portion of the driving rod 102 has a certain capability of free rotation in the central hole 20222, which causes the driving rod 102 to drive the head chain link 2022 to create a swinging effect. Since the head chain link 2022 itself does not rotate and is influenced only by the angular displacement of an adjacent movable chain link 202, the head chain link 2022 swings naturally with the overall motion of the chain.

In design, the central hole 20222 is not completely open, but a constraint angle is set. When an angle formed between the end portion of the driving rod 102 and the central hole 20222 reaches a certain value, the driving rod 102 interferes with an edge of the central hole 20222, which prevents the driving rod 102 from further rotating. The constraint effect limits the angular displacement of the head chain link 2022 within a certain range, thereby preventing excessive swinging or unexpected motion.

When an angle between the driving rod 102 and the central hole 20222 of the head chain link 2022 reaches a critical value of interference, the motion space of the head chain link 2022 is limited, and the constraint is transmitted to the entire chain, which limits a motion range of the movable chain links 202 in the chain. The limiting effect on the motion of the chain helps to maintain the overall structural stability of the chain and prevent the chain from excessive swinging or out-of-control during motion.

Since the central hole 20222 constrains a rotation angle of the driving rod 102, the swinging motion of the head chain link 2022 is limited within a certain range. The design prevents the head chain link 2022 from excessive swinging during motion, thereby ensuring the stability of the motion of the head chain link 2022, preventing an unexpected angular offset, and ensuring more controllability of the motion.

When the angular displacement of the driving rod 102 is limited, a degree of transmission between adjacent chain links in the chain is also limited within a specific range. The constraint effect effectively prevents excessive the angular displacement of the chain, prevents instability or out-of-control of the chain during motion, and ensures more stability of the entire chain throughout the transmission process.

The constraint effect causes the chain to be more controllable during motion, and prevents safety risks caused by excessive swinging or motion of the movable chain links 202 beyond an expected range. During use, the user obtains a more stable and comfortable massage experience without impact by any unexpected action of the massage structure.

The angular constraint of the central hole 20222 on the driving rod 102 causes a swinging range of the head chain link 2022 to be precisely controlled, such that a uniform massage pressure may be provided within a preset angular range. The controllability ensures the coherence and accuracy of the massage action, and helps to achieve a massage effect that better meets human body needs, thereby enhancing user experience.

In this embodiment, the design of the central hole 20222 of the head chain link 2022 achieves the rotational freedom at the end portion of the driving rod 102, which further constrains the angular displacement of the driving rod 102. The design ensures that the head chain link 2022 swings with the chain, and limits the excessive motion of the chain, thereby ensuring more stability of the chain during transmission. The constraint of the central hole 20222 not only enhances the durability and safety of the structure, but also causes the massage action to be more precise and controllable, thereby optimizing the user's overall massage experience.

In a specific embodiment, an area of the central hole 20222 is much smaller than an area of the through gap 3 of the movable chain link 202, because a small area of the central hole 20222 helps to control the free motion of the driving rod 102 in the head chain link 2022, such that the head chain link 2022 does not shake unnecessarily due to an excessively large hole. The design ensures that the head chain link 2022 is more stable during swinging, thereby enhancing the stability of the overall structure.

Moreover, a smaller central hole 20222 limits the radial displacement of the driving rod 102, and prevents excessive swinging of the head chain link 2022 during serpentine transmission. Such limitation prevents an uncomfortable motion amplitude during actual use, and makes the motion process gentler and adapted to human body needs.

To sum up, the area of the central hole 20222 is much smaller than the area of the through gap 3, which ensures that the head chain link 2022 remains stable during precise motion transmission, improves the overall stability of the massager, and extends the service life thereof.

Based on the above, a filling member 20223 is further added, and the filling member 20223 is disposed in the central hole 20222; the filling member 20223 has elasticity; and the filling member 20223 fills a gap between the end portion of the driving rod 102 and an inner wall of the central hole 20222.

An annular gap is formed between the end portion of the driving rod 102 and the inner wall of the central hole 20222, an elastic filling member 20223 is disposed in the gap, an outer ring of the elastic filling member is fixedly connected to the inner wall of the central hole 20222 by means of a medical adhesive, and the inner ring thereof is tightly fitted with the end portion of the driving rod 102.

When the driving assembly drives the driving rod 102 to rotate, the end portion of the driving rod 102 rotates flexibly in the central hole 20222 along with the bending of the chain-type structure. In this case, the elastic filling member 20223 undergoes adaptive deformation along with the rotation of the driving rod 102: when the driving rod 102 tilts to the left, the filling member 20223 on the right is slightly compressed, and the filling member 20223 on the left is slightly stretched, which does not hinder the free rotation of the driving rod 102, completely fills the gap, prevents the shaking of the end portion of the driving rod 102 caused by hitting the inner wall of the central hole 20222 during rotation due to presence of the gap, and reduces the direct friction between the metal driving rod 102 and the support body 2024 of the head chain link 2022.

In actual use, when the chain-type structure bends along an internal curve of the human body, frequent angular adjustment of the head chain link 2022 is required, and the elastic filling member 20223 buffers a local pressure of the end portion of the driving rod 102 on the inner wall of the central hole 20222 through deformation, which significantly improves a degree of fitting between the head chain link 2022 and human tissues.

In a seventh embodiment of the present disclosure, a chain-type massage structure is provided, and on the basis of the previous embodiment, includes a massage head portion 5;

- the massage head portion 5 is connected to the head chain link 2022; and
- the massage head portion 5 moves in response to the angular displacement of the head chain link 2022 to form a swinging motion.

In this embodiment, a massage head portion 5 is added for the chain-type massage structure on the basis of the previous embodiment, and the massage head portion 5 is directly connected to the head chain link 2022. Through the design, the massage head portion 5 may swing with the angular displacement of the head chain link 2022, thereby achieving multi-angle massage effects.

Specifically, the massage head portion 5 is directly connected to the head chain link 2022, so any angular displacement of the head chain link 2022 is synchronously transmitted to the massage head portion 5. Since the head chain link 2022 swings, the massage head portion 5 performs a corresponding swinging motion. The swinging motion is achieved through the serpentine transmission controlled by a chain transmission system and the driving rod 102, such that the massage head portion 5 naturally adapts to the human body curve, thereby achieving a gentle massage effect.

The angular displacement of the head chain link 2022 is limited by the chain-type structure and controlled by the transmission of the driving rod 102, such that the swinging motion of the massage head portion 5 is achieved within a certain angular range, thereby preventing excessive or uneven swinging. The massage head portion 5 swings with the angular displacement of the head chain link 2022, which maintains synchronization with the chain motion, and ensures that the swinging of the massage head portion 5 is continuous and smooth, thereby providing a consistent massage force.

The massage head portion 5 dynamically fits a target area with the swinging of the head chain link 2022, and through continuous angular adjustment, the massage head portion 5 better adapts to the curve of the human body surface, thereby enhancing the comfort of massage. The swinging motion enables the massage head portion 5 to act on a massage area from a plurality of angles, thereby achieving all-round stimulation and a deep massage effect.

In this embodiment, the massage head portion 5 is added for the chain-type massage structure, and the massage head portion moves in response to the angular displacement of the head chain link 2022 to form a swinging motion, which significantly enhances the conformability, comfort and controllability of the massage. The swinging of the massage head portion 5 not only achieves multi-angle massage stimulation, but also brings a gentle and continuous massage experience.

In a specific embodiment, a length of the massage head portion 5 may be designed to account for 10% to 30% of a total length of the entire chain, and a specific proportion depends on the expected massage needs and use comfort. The proportion is specially designed, that is, the length of the massage head portion 5 is appropriately controlled within a certain proportion of the total length of the entire chain, which ensures that the massage head portion 5 adequately covers a target area when coming into contact with the human body, and prevents affecting the transmission effect due to an excessive length.

When the massage head portion 5 is too long, the flexibility of the chain-type structure is reduced, thereby affecting the transmission effect of the serpentine transmission in each of the movable chain links 202. The proportion of the length of the massage head portion 5 is controlled within a range of 10% to 30%, which helps to maintain the flexibility of the overall chain, and ensures better fitting with the human body curve during massage.

Moreover, a moderate proportion of the length of the massage head portion 5 prevents a front end of the massager from being too heavy or unevenly stressed during operation, thereby ensuring the balance and stability of the structure during transmission. The moderate length of the massage head portion 5 helps to precisely control the pressure and amplitude of the massage area, thereby providing the user with a gentle but precise massage experience.

As shown in FIGS. 11 to 16, a chain-type massage structure is provided in an eighth embodiment of the present disclosure, and on the basis of the previous embodiment, includes a stimulation device 6;

- the stimulation device 6 is disposed in the massage head portion 5;
- the stimulation device 6 delivers a vibration massage stimulation; or
- the stimulation device 6 delivers a telescopic massage stimulation.

In this embodiment, a stimulation device 6 is added for the chain-type massage structure on the basis of the previous embodiment, and the stimulation device 6 is disposed in the massage head portion 5. Through the design, the stimulation device 6 provides different types of stimulation during the massage process, thereby further enriching the massage effect. Specific stimulation modes of the stimulation device 6 include vibration stimulation or telescopic stimulation, and these different stimulation modes bring diverse massage experiences.

Specifically, the stimulation device 6 is a vibration device 601 (such as a vibration motor), which performs a high-speed small-amplitude reciprocating motion in the massage head portion 5, causing the massage head portion 5 to vibrate slightly. The vibration is transmitted to an inner cavity of a target area of a female user (such as an inner wall of her vagina), thereby enhancing the sense of massage stimulation.

Specifically, the stimulation device 6 is a telescopic device 602 (such as a telescopic motor), which drives the massage head portion 5 to perform a telescopic motion within a certain range through an internal mechanical or pneumatic system (in this case, the massage head portion 5 and the head chain link 2022 are elastically connected, such that the massage head portion 5 performs a telescopic displacement), and the effect of pressing or kneading is simulated. Deep insertion into a massage area (such as the inner wall of her vagina) is achieved, which enables to provide a more fitted and in-depth massage experience.

In this embodiment, the stimulation device 6 is integrated into the massage head portion 5 of the chain-type massage structure, to achieve vibratory or telescopic stimulation. The design not only enhances the diversity and conformability of the massage, but also enables the massage device to meet the massage needs of different depths and areas, thereby providing a personalized and three-dimensional massage experience.

In a ninth embodiment of the present disclosure, a chain-type massage structure is provided, and on the basis of the previous embodiment, the massage head portion 5 and the head chain link 2022 form an included angle p; and the included angle p ranges from 30° to 90°.

In this embodiment, the included angle of 30° to 90° is formed between the massage head portion 5 and the head chain link 2022, such that the massage head portion 5 exhibits superior conformability and flexibility in in-vivo applications. The included angle design is especially suitable for internal natural curves of the human body, and effectively adapts to body areas at different angles, thereby providing a more comfortable and precise massage experience.

Specifically, the included angle is designed to range from 30° to 90°, which provides flexible angle options for the massage head portion 5, and enables to better fit the internal natural curves of the human body. A key function of an insertable sexual massager lies in moving smoothly in a complex physiological structure, and the included angle design effectively enhances the adaptability of the massage head portion 5 to different body positions. The included angle of less than 90° ensures that the massage head portion 5 maintains a smooth, non-abrupt motion, and prevents discomfort caused by a too large or too small angle, thereby providing the user with a gentle experience.

In summary, a smaller included angle of 30° is suitable for smooth in-vivo massage, which enables to provide a gentle massage experience; and a larger included angle of 90° is suitable for deep pressing and stimulation, which effectively enhances the flexibility and controllability of the massage head portion 5, and meets different use needs. After adjustment to a larger included angle, the massage head portion 5 directly acts on a specific area to simulate the effect of deep kneading, which provides a strong sense of stimulation, and is suitable for the user pursuing the deep massage experience.

On the one hand, the design of the included angle of 30° to 45° is combined with the swinging action of the massage head portion 5 to bring a comfortable and smooth massage experience suitable for a shallow vaginal area. An included angle between the massage head portion 5 and the vaginal wall is maintained at 30° to 45°, which effectively reduces the resistance during insertion. A smaller included angle causes the massage head portion 5 to present a more streamlined posture when coming into contact with the vaginal entrance, thereby ensuring smooth insertion without generation of an abrupt pressure.

Moreover, the smooth in-vivo angle design conforms to the natural curve of the shallow vaginal area, such that the massage head portion 5 fits the vaginal wall during insertion, thereby preventing friction or prickling sensation caused by a too large angle.

Additionally, the design of the included angle of 30° to 45° ensures that when the massage head portion 5 swings during insertion, a finger squeezing effect is simulated. The smaller included angle causes the swinging action to be gentle and smooth in the shallow vaginal area, which brings a kneading and squeezing experience similar to manual massage. The combination of the swinging action and the small included angle ensures that the massage head portion 5 is not inserted too deeply, but gentle swinging back and forth in the shallow area is achieved. During the swinging process, the massage head portion 5 stably remains within an appropriate depth range, which enables the gentler and more continuous massage.

The small included angle design ensures that the massage head portion 5 better fits the curve of the shallow vaginal area during swinging, and adapts to different physiological shapes. The swinging action is combined with the included angle design, such that the massage head portion 5 moves in the vagina more flexibly, and evenly stimulates the shallow area.

On the other hand, the design of the included angle of 90° ensures that the massage head portion 5 stimulates the vagina in a deeper and more direct manner.

Specifically, at an included angle of 90°, the swinging action of the massage head portion 5 generates a concentrated pressure perpendicular to the vaginal wall, and the massage effect generated by swinging each time is more concentrated, which is suitable for the users who need deep massage, and creates a more obvious massage stimulation effect.

The included angle of 90° makes the swinging action more concentrated in a specific area, and repeated squeezing increases an intensity of stimulation to the specific area, which is suitable for deep massage of specific sensitive points in the vagina. That is, the massage head portion 5 applies a force generated by the swinging to the vaginal wall in a more concentrated manner, which is suitable for strong massage in the shallow or deep vaginal area. The intensity-increasing design ensures that the user has a stronger and deeper massage experience.

In a tenth embodiment of the present disclosure, a chain-type massage structure is provided, and on the basis of the previous embodiment, the massage head portion 5 has a straight rod-shaped structure;

alternatively, the massage head portion 5 has a curved rod-shaped structure;

alternatively, the massage head portion 5 has a spherical structure; and alternatively, the massage head portion 5 has a mushroom head-shaped structure.

Figure 13:
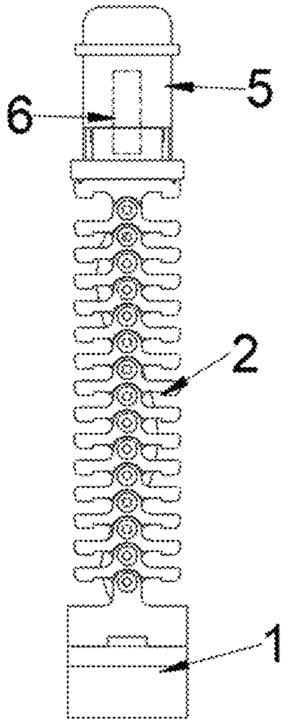
FIG. 13 is a schematic diagram of an included angle p (equal to) 90° between a massage head portion and a head chain link in a chain-type massage structure provided by the present disclosure.
Figure 14:
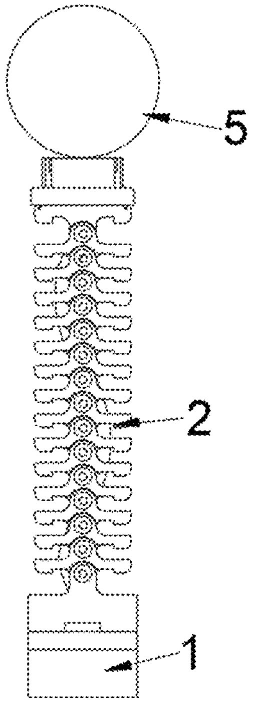
FIG. 14 is a schematic diagram of a massage head portion of a spherical structure in a chain-type massage structure provided by the present disclosure.

As shown in FIGS. 12 to 14, in this embodiment, the massage head portion 5 is designed to have different shapes, including the straight rod shape, the curved rod shape, the spherical shape, and the mushroom head shape, and the chain-type massage structure meets different massage needs during use, and provides the user with diverse massage experiences. The massage head portions 5 of different shapes bring unique effects and advantages, which enhances the chain-type massage structure's adaptability, and meets the user' personalized preferences.

Specifically, the straight rod-shaped structure causes the massage head portion 5 to present a linear shape, which is simple and direct. The straight rod-shaped structure enables more direct and deeper insertion into the target area, which is suitable for the users who need deeper massage. The straight rod-shaped massage head portion 5 is relatively uniform and achieves the effect of continuous and uniform squeezing in the vagina, bringing a stable massage experience. The straight rod-shaped design easily enables the combination of deep and shallow massage in the vagina, which meets different massage needs.

The curved rod-shaped structure ensures that the massage head portion 5 has a certain curvature, and a bending angle may be designed according to the natural curve of the human body. The curved design better conforms to the physiological structure of the vagina, and the massage head portion 5 better fits the internal curve of the human body after insertion, thereby providing a more comfortable experience. The curved rod-shaped structure is especially suitable for fixed-point massage of specific areas, such as precise stimulation of a G-spot area. The curved design causes the massage head portion 5 to naturally come into contact with these areas, thereby achieving concentrated and deep massage effects.

The spherically structured massage head portion 5 is spherical in shape, and has a smooth surface and a relatively small contact area. The spherically structured massage head portion 5 concentrates pressure on a single point, thereby generating strong fixed-point stimulation, which is suitable for the users who need local deep massage. The massage head portion 5 with a spherical surface touches the vagina in a smoother manner, which reduces the friction, and is suitable for relatively sensitive areas. The spherical structure ensures uniform stimulation in a plurality of directions and creates a three-dimensional massage effect, without restriction in direction during the swinging process.

The mushroom head-shaped massage head portion 5 is shaped like a mushroom with a wider top, smooth edges, and a narrower bottom. The mushroom head design enables a large contact area during massage, which creates a more comfortable and gentler massage experience by dispersing the massage pressure, and is suitable for long-duration massage. The wide top of the mushroom head covers a large area, which is suitable for massaging the vaginal entrance or sensitive areas, and creates a gentle kneading effect. The mushroom head design makes the massage head portion 5 less likely to slide in the vagina, which facilitates stable fixed-point massage at specific positions and enables to achieve continuous gentle stimulation.

The massage head portions 5 of different shapes meet various needs for shallow and deep massage and also gentle and intense massage. The user may select the massage head portions 5 of different shapes according to personal preferences and needs to achieve a personalized massage experience.

Different shapes of the massage head portion 5 enhance the versatility of the chain-type massage structure provided by the present disclosure, and ensure that the chain-type massage structure adapts to different body structures and physiological curves, and better fits target body parts.

In some scenarios, the straight rod-shaped structure is suitable for deep massage, and enables kneading massage in the deep vaginal area, which is suitable for the users who need deep stimulation.

In other scenarios, the curved rod-shaped structure and the spherical structure achieve concentrated and precise massage, which is particularly suitable for fixed-point stimulation of sensitive body parts such as the G-spot.

In yet other scenarios, the mushroom head structure creates a wide-surface massage effect, which is suitable for gentle massage of sensitive areas, especially for long-term use, and reduces fatigue caused by intense massage.

In this embodiment, the massage head portions 5 of the straight rod shape, the curved rod shape, the spherical shape, and the mushroom head shape are provided, such that the chain-type massage structure meets diverse massage needs. The massage head portions 5 of different shapes are designed for specific massage experiences, and respectively adapt to different stimulation needs and human body structure characteristics. Such design not only enhances the flexibility and applicability of the massager, but also increases personalized choices for the user, and enables to provide the user with a richer and more comfortable massage experience.

In an eleventh embodiment of the present disclosure, a chain-type massage structure is provided, and on the basis of the previous embodiment, the fixed chain link 201 and the movable chain links 202 are provided with threading holes.

In this embodiment, the threading holes are on the fixed chain link 201 and the movable chain links 202, such that the chain-type massage structure enables to arrange an electric wire, an air tube, or any other transmission device through the threading holes, which provides necessary power support for internal assemblies such as the stimulation device 6 and a power supply. The design of the threading holes causes the neater and safer wiring of the chain-type massage structure provided by the present disclosure, and prevents external lines from interfering with the flexible motion of the massage structure.

Arranging a transmission line in the movable chain link 202 effectively prevents external lines from interfering with the free swinging and flexibility of the chain-type massage structure, and enhances the overall stability and durability of the chain-type massage structure provided by the present disclosure.

The threading holes enable favorable protection of the electric wire in the movable chain link 202, which prevents damage to the electric wire due to friction or pulling during the operation of the chain-type massage structure provided by the present disclosure. The protective design prolongs the service life of the electric wire, an air tube, or any other transmission device, and minimizes the maintenance frequency.

Moreover, the internal threading design prevents entanglement or jamming of external lines, and ensures that the movable chain link 202 is not restricted by external lines when swinging or rotating, thereby enabling to provide a more stable massage experience.

In a specific embodiment, the threading holes are formed on both sides of the movable chain link 202.

Based on the above, further, the threading holes are located outside an area where the driving rod 102 applies a force to the fixed chain link 201 and the movable chain link 202.

The threading holes of the fixed chain link 201 and the movable chain link 202 are configured to arrange power lines of the chain-type massage structure provided by the present disclosure. The threading holes are formed on an outer side of the hinge portion 2021 of the support body 2024 of the chain link. Specifically, the hinge portions 2021 of the movable chain link 202 are located on two circumferential sides of the support body 2024, and the threading holes are formed in a middle of an ear-shaped protrusion; and the threading holes of the fixed chain link 201 are formed near the end portion N1 connected to the driving member 101, which completely bypasses a friction range and stress area when the driving rod 102 rotates.

In actual use, when the driving rod 102 rotates at a high speed, since the threading holes are away from the contact area, internal power lines and signal lines are not rubbed by the driving rod 102; and when the chain-type structure bends, the contact area, whose structural strength is not weakened by the threading holes, still stably bears a torque exerted by the driving rod 102, thereby preventing cracking of the chain links.

In a twelfth embodiment of the present disclosure, a chain-type massage structure is provided, and on the basis of the previous embodiment, an end face of the movable chain link 202 facing the fixed chain link 201 is provided with a limiting flange 2023; and moreover, the limiting flange 2023 protrudes toward the fixed chain link 201 in a circumferential direction of the movable chain link 202.

In this embodiment, the limiting flange 2023 is arranged on an end face of each of the movable chain links 202 to protrude toward an end face of an adjacent movable chain link 202, and the limiting flange 2023 directly abuts against the end face of the adjacent movable chain link 202. On one hand, the design ensures stable linkage between the movable chain links 202; and on the other hand, the limiting flange 2023 limits the angular displacement between the movable chain links 202, and prevents any excessive angular offset of the movable chain links 202 during the swinging process.

Specifically, on one hand, the limiting flanges 2023 are designed to abut against each other on the end faces of adjacent movable chain links 202, such that a tightly interlocked structure is formed, and each of the movable chain links 202 smoothly drives the adjacent movable chain link 202 during motion, thereby ensuring the stable linkage of the entire chain-type massage structure. The abutment of the limiting flanges 2023 causes the angular displacement of one of the movable chain links 202 to be smoothly transmitted to the next movable chain link 202, and the linkage design effectively prevents the independent motion between the movable chain links 202, such that the entire massage structure maintains coherence of swinging or transmission.

On the other hand, the existence of the limiting flanges 2023 imposes physical constraints on the angular displacement between adjacent movable chain links 202, such that each of the movable chain links 202 swings only within a reasonable range. The design prevents an excessive angular offset between the movable chain links 202, thereby ensuring the stability of the chain. Limiting the angular displacement of the movable chain links 202 prevents structural stress concentration caused by excessive angular swinging, and reduces wear between the movable chain links 202; and additionally, such limitation prevents excessive motion of the massage head portion 5, and prevents discomfort or accidental injury to peripheral tissues.

Since the limiting flanges 2023 limit excessive angular displacements, the chain maintains consistent angular transmission when swinging, and ensures that the massage head portion 5 fits a massage area at an appropriate angle, thereby achieving uniform and consistent massage effects.

Figure 17:
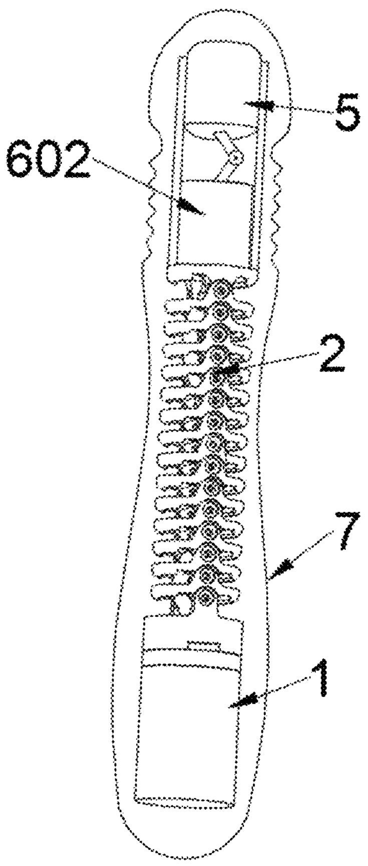
FIG. 17 is a schematic structural diagram of a chain-type massage structure provided by the present disclosure where a stimulation device is a telescopic device.
Figure 18:
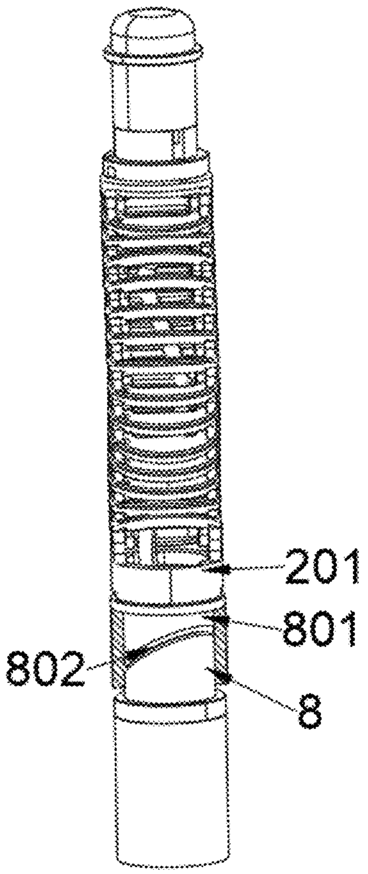
FIG. 18 is a schematic diagram of a linear driving structure added to a chain-type massage structure provided by the present disclosure.

As shown in FIGS. 17 and 18, a chain-type massage structure is provided in a thirteenth embodiment of the present disclosure, and on the basis of the previous embodiment, includes a linear driving structure 8;

- the linear driving structure 8 is respectively connected to the driving member 101 and the massage assembly 2; and
- the linear driving structure 8 is configured to drive the massage assembly 2 to perform a linear reciprocating motion.

In this embodiment, the linear driving structure 8 specifically includes a rotating seat 801, one end of the rotating seat 801 is connected to the driving rod 102, and the other end thereof is connected to the driving member 101. An enclosed helical groove 802 is formed on a circumferential wall surface of the rotating seat 801, a displacement seat 803 is slidably sleeved on the circumferential wall surface of the rotating seat 801, a sliding block 804 engaged with the helical groove 802 is formed on an inner wall surface of the displacement seat 803, and the fixed chain link 201 of the massage assembly 2 is connected to the displacement seat 803. When the driving member 101 drives the rotating seat 801 to rotate, the sliding block 804 performs a reciprocating displacement in the helical groove 802, which drives the fixed chain link 201 and the movable chain links 202 of the massage assembly 2 to perform the overall reciprocating linear displacement, thereby enhancing the sense of massage stimulation.

Figure 15:
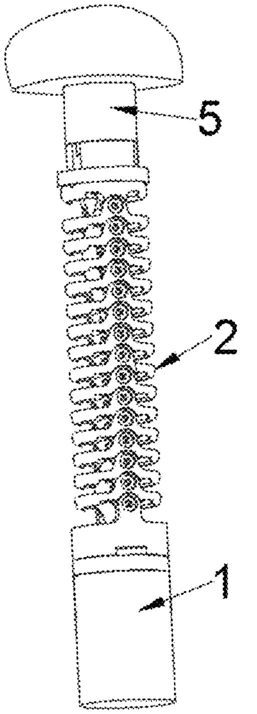
FIG. 15 is a schematic diagram of a massage head portion of a mushroom head-shaped structure in a chain-type massage structure provided by the present disclosure.
Figure 16:
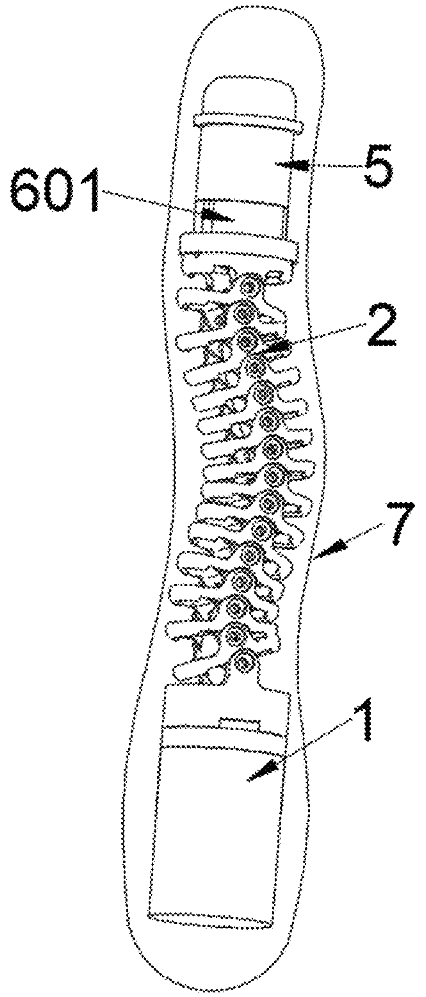
FIG. 16 is a schematic structural diagram of a chain-type massage structure provided by the present disclosure where a stimulation device is a vibration device.

As shown in FIGS. 15 and 16, a massager is provided in a fourteenth embodiment of the present disclosure, including:

- the chain-type massage structure according to any one of the above embodiments.

A massager is provided in the present disclosure, not only including the chain-type massage structure according to any one of the above embodiments, but also further including a silicone layer 7 outside the chain-type massage structure. The encapsulation design of the silicone layer 7 enables the massager to maintain structural stability while enhancing softness and comfort in touch, thereby significantly enhancing the user's massage experience.

The silicone layer 7 is wrapped around an exterior of the chain-type massage structure, such that the massager is soft and skin-friendly. Compared with an exposed chain-type structure, the silicone layer 7 comes into contact with the skin more gently, and prevents discomfort caused by a hard structure, which is especially suitable for more sensitive massage areas.

Moreover, the silicone material has good flexibility and naturally deforms with the motion of the massager, which better fits the human body curve.

Based on the above, massage heads 70 are further added, and a plurality of the massage heads 70 are disposed on an outer surface of the silicone layer 7.

The shapes of the massage heads 70 include, but are not limited to, a spherical shape, a strip shape, a petal shape, and the like, and the present disclosure is described by taking the spherical massage head 70 as an example.

When the driving member 101 drives the driving rod 102 to rotate, the driving rod 102 pushes the movable chain link 202 to swing around the hinge portion 2021 through the gap 3, such that the silicone layer 7 arches outward along with the motion of the movable chain link 202. The spherical massage head 70 moves along with the swinging of the movable chain link 202, which generates the high-frequency point-pressing stimulation on contacted human tissues, and improves the massage effect of the massager on the user.

Figure 19:
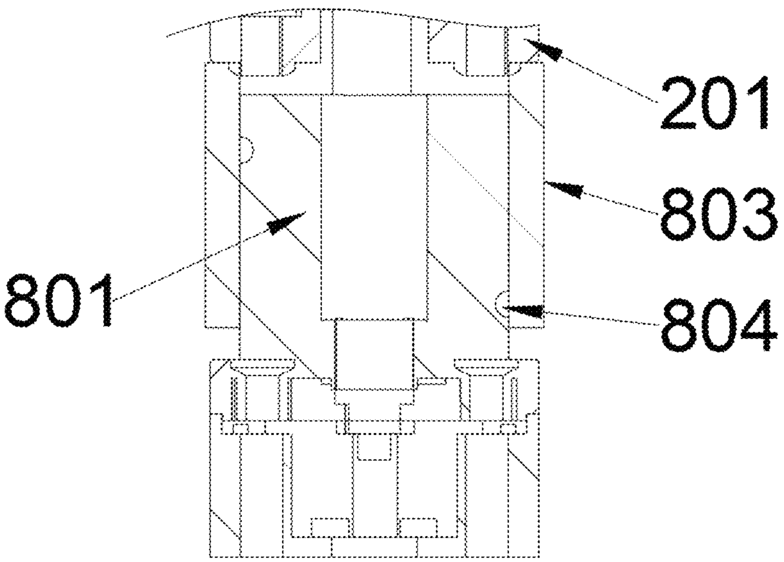
FIG. 19 is a sectional view of a linear driving structure in a chain-type massage structure provided by the present disclosure.

As shown in FIG. 19, a massager is provided in a fifteenth embodiment of the present disclosure, the silicone layer 7 includes a plurality of first areas 71 and a plurality of second areas 72; the plurality of the first areas 71 and the plurality of the second areas 72 are disposed in a staggered manner; a thickness of each of the first areas 71 is larger than a thickness of each of the second areas 72; the massage heads 70 are disposed in the first areas 71; and each of the first areas 71 is provided with at least one of the massage heads 70.

Junctions of the first areas 71 and the second areas 72 transition smoothly.

The hardness of the massage heads 70 may be greater than the hardness of other portions of the silicone layer 7.

When the driving rod 102 pushes the movable chain links 202 to swing, the silicone layer 7 arches outward along with the motion of the chain links:

Due to a larger thickness of the first areas 71, during the process that the silicone layer 7 arches due to support by the chain-type structure, an internal material of the silicone layer flows toward the massage head 70 to make up for the deformation of the massage head 70 caused by stretching (that is, when the silicone layer 7 is pushed up by the chain links, the excess material in the first areas 71 supports the massage head 70, which prevents the massage head from being flattened or protrusion narrowing due to the effect of overall stretching). Due to a smaller thickness, the second areas 72 flexibly deform along with the bending of the hinge portions 2021 of the chain links, without hindering the swinging of the chain-type structure. Due to thickness-based material reserve, the first areas 71 ensure that the massage head 70 still maintains a sufficient protrusion size when the silicone layer 7 arches, which solves the problem that the massage head 70 protrudes insufficiently due to stretching when the silicone layer 7 has a uniform thickness, and ensures stable and effective stimulation of the massager on the massage area.

Figure 20:
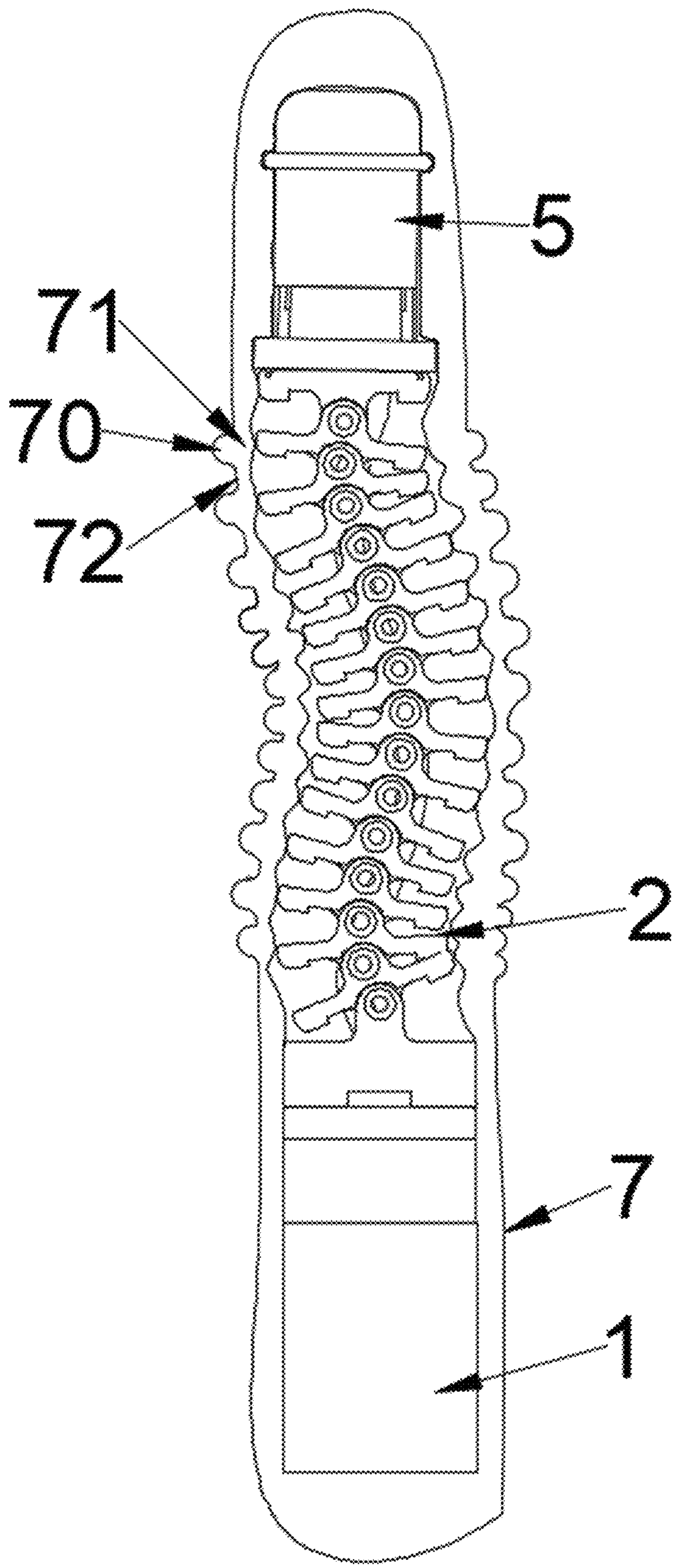
FIG. 20 is a sectional view of a silicone layer of a massager provided by the present disclosure including a first area and a second area.
Figure 21:
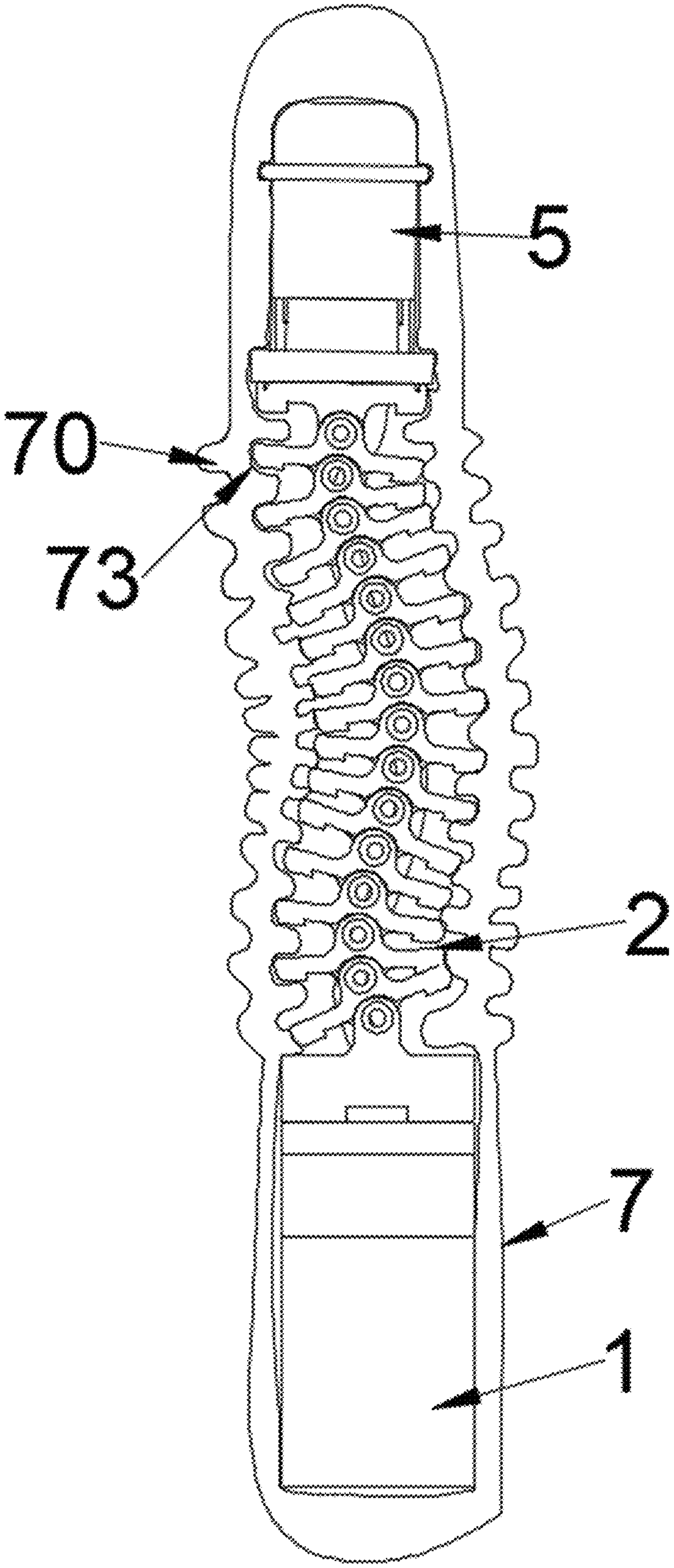
FIG. 21 is a sectional view of a massager provided by the present disclosure where a positioning groove is added to a silicone layer.

As shown in FIG. 20, a massager is provided in a sixteenth embodiment of the present disclosure, and a plurality of positioning grooves 73 are formed on an inner wall of the silicone layer 7; a plurality of the movable chain links 202 are in one-to-one correspondence with a plurality of the positioning grooves 73; one side of the support body 2024 that pushes the silicone layer 7 to arch outward extends into the positioning groove 73, and the other side of the support body 2024 disengages from the positioning groove 73; and a plurality of the massage heads 70 are in one-to-one correspondence with a plurality of the positioning grooves 73.

When the driving rod 102 drives the movable chain link 202 to move, the support body 2024 of the movable chain link 202 swings along with the helical structure of the driving rod 102: when the support body 2024 swings to one side, one side of the support body that pushes the silicone layer 7 to arch outward is precisely snap-fitted into the corresponding positioning groove 73 and closely fitted with an inner wall of the positioning groove 73, and in this case, the support body 2024 directly presses against the silicone layer 7 through the positioning groove 73, such that the massage head 70 corresponding to the positioning groove 73 protrudes outward along with a pushing force of the support body 2024. Additionally, the other side of the support body 2024 (the side that does not push the silicone layer 7) disengages from the positioning groove 73, without affecting the motion of the silicone layer 7 and the chain-type massage structure. The positioning groove 73 is equivalent to a force transmission channel, and the pushing force of the support body 2024 acts on the corresponding massage head 70 in a concentrated manner through the positioning groove 73, which prevents force dispersion caused by the overall deformation of the silicone layer 7. Without the positioning groove 73, the pushing force of the support body 2024 causes the entire silicone layer 7 to bulge, instead of causing a specific massage head 70 to protrude. Therefore, the massage head 70 exerts force precisely along with the swinging of the support body 2024, thereby ensuring effective stimulation of the target area.

In the description of the embodiments of the present disclosure, specific features, structures, materials or characteristics described may be combined in a suitable manner in any one or more examples or embodiments.

Although the embodiments of the present disclosure have been illustrated and described, it should be understood that those of ordinary skill in the art may make various changes, modifications, replacements and variations to the above embodiments without departing from the principle and spirit of the present disclosure, and the scope of the present disclosure is limited by the appended claims and their legal equivalents.

What is claimed is:

1. A chain-type massage structure, comprising:

a driving assembly, provided with a driving member and a driving rod connected to the driving member, wherein the driving rod has a helical structure;

a massage assembly, provided with a fixed chain link and a plurality of movable chain links;

wherein each of the plurality of movable chain links comprises a support body and hinge portions disposed on two circumferential sides of the support body;

the support body of each of the plurality of movable chain links is provided with a gap for the driving rod to penetrate;

the plurality of movable chain links are sequentially hinged through the hinge portions of adjacent movable chain links to form a bendable chain-type structure;

one end portion (N1) of the fixed chain link is fixedly connected to the driving member, and the other end portion (N2) thereof is hinged to one of the plurality of movable chain links; and in a direction away from the fixed chain link, a width (W1) of a gap of a first movable chain link of the plurality of movable chain links is greater than or equal to a width (WN) of a gap of any of remaining movable chain links of the plurality of movable chain links.

2. The chain-type massage structure according to claim 1, wherein in the direction away from the fixed chain link, a width (W2) of a gap of a second movable chain link of the plurality of movable chain links is equal to the width (W1) of the gap of the first movable chain link of the plurality of movable chain links and is greater than the width (WN) of a gap of any of remaining movable chain links of the plurality of movable chain links.

3. The chain-type massage structure according to claim 1, wherein in the direction away from the fixed chain link, the following condition is satisfied:

$$D1>WN\geq D2;$$

wherein D1 represents a maximum motion trajectory diameter of a bent portion of the driving rod when rotating, and D2 denotes a body diameter of the driving rod.

4. The chain-type massage structure according to claim 3, wherein a hinge point of the fixed chain link is a chain node (A), a hinge point of the first movable chain link is a chain node (C), and a distance between the chain node (A) and the chain node (C) is expressed by (H), which satisfies the following relationship:

$$H/2+W1=D1.$$

5. The chain-type massage structure according to claim 1, wherein in the direction away from the fixed chain link, when the support body of the first movable chain link is parallel to the fixed chain link, a distance (L1) between the support body of the first movable chain link and the fixed chain link is greater than a spacing (LN) between any two adjacent movable chain links when their support bodies are parallel to each other.

6. The chain-type massage structure according to claim 1, wherein each of the hinge portions comprises two chain nodes, and the chain nodes are respectively configured to hinge each of the plurality of movable chain links with two adjacent movable chain links so as to form the chain-type structure.

7. The chain-type massage structure according to claim 1, wherein the chain link among the movable chain links farthest from the fixed chain link is a head chain link;

an end portion of the driving rod penetrates the head chain link; and the end portion of the driving rod rotates freely.

8. The chain-type massage structure according to claim 7, wherein the head chain link is provided with a central hole;

the end portion of the driving rod penetrates the central hole; and the end portion of the driving rod rotates freely in the central hole.

9. The chain-type massage structure according to claim 8, wherein a filling member is disposed in the central hole;

the filling member has elasticity; and the filling member fills a gap between the end portion of the driving rod and an inner wall of the central hole.

10. The chain-type massage structure according to claim 8, comprising a massage head portion;

wherein the massage head portion is connected to the head chain link; and the massage head portion moves in response to an angular displacement of the head chain link to form a swinging motion.

11. The chain-type massage structure according to claim 10, comprising a stimulation device;

wherein the stimulation device is disposed in the massage head portion;

the stimulation device delivers a vibration massage stimulation; or the stimulation device delivers a telescopic massage stimulation.

12. The chain-type massage structure according to claim 10, wherein the massage head portion has a straight rod-shaped structure;

alternatively, the massage head portion has a curved rod-shaped structure;

alternatively, the massage head portion has a spherical structure; and alternatively, the massage head portion has a mushroom head-shaped structure.

13. The chain-type massage structure according to claim 1, wherein the fixed chain link and the plurality of movable chain links are provided with threading holes.

14. The chain-type massage structure according to claim 13, wherein the threading holes are located outside an area where the driving rod applies a force to the fixed chain link and the plurality of movable chain links.

15. The chain-type massage structure according to claim 1, wherein an end face of each of the plurality of movable chain links facing the fixed chain link is provided with a limiting flange; and the limiting flange protrudes toward the fixed chain link in a circumferential direction of each of the plurality of movable chain links.

16. The chain-type massage structure according to claim 1, comprising a linear driving structure;

wherein the linear driving structure is respectively connected to the driving member and the massage assembly; and the linear driving structure is configured to drive the massage assembly to perform a linear reciprocating motion.

17. A massager, comprising:

a silicone layer;

a chain-type massage structure;

wherein the chain-type massage structure comprises a driving assembly and a massage assembly;

wherein the driving assembly is provided with a driving member and a driving rod connected to the driving member, wherein the driving rod has a helical structure;

the massage assembly is provided with a fixed chain link and a plurality of movable chain links;

wherein each of the plurality of movable chain links comprises a support body and hinge portions disposed on two circumferential sides of the support body;

the support body of each of the plurality of movable chain links is provided with a gap for the driving rod to penetrate;

the plurality of movable chain links are sequentially hinged through the hinge portions of each of the plurality of movable chain links to form a bendable chain-type structure;

one end of the fixed chain link is connected to the driving member and the other end of the fixed chain link is connected to a first movable chain link of the plurality of movable chain links;

the silicone layer is wrapped around an exterior of the chain-type massage structure; and the driving rod pushes the silicone layer to arch outward through the plurality of movable chain links to massage a user's massage area.

18. The massager according to claim 17, wherein a plurality of massage heads are disposed on an outer surface of the silicone layer.

19. The massager according to claim 18, wherein the silicone layer comprises a plurality of first areas and a plurality of second areas;

the plurality of the first areas and the plurality of the second areas are disposed in a staggered manner;

a thickness of each of the first areas is larger than a thickness of each of the second areas;

the massage heads are disposed in the first areas;

and each of the first areas is provided with at least one of the massage heads.

20. The massager according to claim 18, wherein a plurality of positioning grooves are formed on an inner wall of the silicone layer;

the plurality of the movable chain links is in one-to-one correspondence with the plurality of the positioning grooves;

one side of the support body of each of the plurality of the movable chain links that pushes the silicone layer to arch outward extends into a corresponding positioning groove, and the other side of the support body disengages from the corresponding positioning groove; and the plurality of the massage heads is in one-to-one correspondence with the plurality of the positioning grooves.

* * * * *